US011151231B2

(12) United States Patent
Bolotin et al.

(10) Patent No.: US 11,151,231 B2
(45) Date of Patent: *Oct. 19, 2021

(54) SECURE ACCESS DEVICE WITH DUAL AUTHENTICATION

(71) Applicant: ClevX, LLC, Kirkland, WA (US)

(72) Inventors: Lev M. Bolotin, Kirkland, WA (US); Alex Lemelev, Maple (CA); Marc Singer, Seattle, WA (US)

(73) Assignee: ClevX, LLC, Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,641

(22) Filed: Jun. 29, 2020

(65) Prior Publication Data

US 2020/0327211 A1 Oct. 15, 2020

Related U.S. Application Data

(63) Continuation of application No. 16/021,547, filed on Jun. 28, 2018, now Pat. No. 10,754,992, which is a
(Continued)

(51) Int. Cl.
*G06F 21/31* (2013.01)
*G06F 21/78* (2013.01)
(Continued)

(52) U.S. Cl.
CPC .......... *G06F 21/31* (2013.01); *G06F 21/6218* (2013.01); *G06F 21/78* (2013.01);
(Continued)

(58) Field of Classification Search
CPC .......... G06F 21/31; G06F 21/34; G06F 21/44; G06F 21/32; G06F 21/6218; G06F 21/78; G06F 21/35; H04W 12/0608; H04W 12/0609; H04W 12/068; H04W 12/08; H04W 12/069; H04W 12/0802;
(Continued)

(56) References Cited

U.S. PATENT DOCUMENTS 5,942,985 A  8/1999  Chin
6,085,090 A  7/2000  Yee et al.
(Continued)

FOREIGN PATENT DOCUMENTS

CN  1378667 A  11/2002
CN  108604982 A  9/2018
(Continued)

OTHER PUBLICATIONS

"United Kingdom Application Serial No. 1919421.6, Intent to Grant Under Section 18(4) dated Oct. 9, 2020", 2 pgs.
(Continued)

*Primary Examiner* — David Garcia Cervetti
(74) *Attorney, Agent, or Firm* — Schwegman Lundberg & Woessner, P.A.

(57) ABSTRACT

A data security system, and a method of operation thereof, includes a data security transceiver or receiver; an authentication subsystem operatively connected to the data security transceiver or receiver; and a storage subsystem connected to the authentication subsystem.

20 Claims, 13 Drawing Sheets

Related U.S. Application Data continuation of application No. 14/987,749, filed on Jan. 4, 2016, now Pat. No. 10,181,055, which is a continuation-in-part of application No. 12/680,742, filed as application No. PCT/US2008/077766 on Sep. 26, 2008, now Pat. No. 9,262,611.

(60) Provisional application No. 60/975,814, filed on Sep. 27, 2007.

(51) Int. Cl.
*H04L 29/06* (2006.01)
*G06F 21/62* (2013.01)
*H04W 12/06* (2021.01)
*H04W 12/069* (2021.01)

(52) U.S. Cl.
CPC ........... *H04L 63/083* (2013.01); *H04W 12/06* (2013.01); *H04W 12/068* (2021.01); *H04W 12/069* (2021.01)

(58) Field of Classification Search
CPC .. H04W 12/06; H04W 12/02; H04L 63/0861; H04L 63/0876; H04L 9/3226; H04L 63/061; H04L 63/0492; H04L 2209/80; H04L 63/08; H04L 9/3234; H04L 63/0869; H04L 9/3271; H04L 63/0853; H04L 63/083
See application file for complete search history.

(56) References Cited

U.S. PATENT DOCUMENTS

| | | | | |
|---|---|---|---|---|
| 6,175,922 | B1 | 1/2001 | Wang | |
| 6,298,441 | B1 | 10/2001 | Bar-on et al. | |
| 6,480,096 | B1 | 11/2002 | Gutman et al. | |
| 6,490,443 | B1 | 12/2002 | Freeny, Jr. | |
| 6,529,949 | B1 * | 3/2003 | Getsin | G06F 21/10 380/202 |
| 6,542,071 | B1 | 4/2003 | Ohtsubo et al. | |
| 6,760,688 | B2 | 7/2004 | Suzuki et al. | |
| 6,763,252 | B2 | 7/2004 | Itazawa | |
| 6,795,421 | B1 * | 9/2004 | Heinonen | H04W 88/08 370/338 |
| 6,845,398 | B1 * | 1/2005 | Galensky | G06Q 20/32 709/203 |
| 6,954,753 | B1 | 10/2005 | Jeran | |
| 6,975,202 | B1 * | 12/2005 | Rodriguez | G07C 9/27 340/5.25 |
| 6,985,719 | B2 | 1/2006 | Leppinen et al. | |
| 7,043,643 | B1 * | 5/2006 | Doe | G06F 21/34 713/186 |
| 7,069,447 | B1 | 6/2006 | Corder | |
| 7,089,424 | B1 * | 8/2006 | Subbiah | G06F 21/85 380/278 |
| 7,120,696 | B1 | 10/2006 | Au et al. | |
| 7,269,634 | B2 | 9/2007 | Getsin et al. | |
| 7,377,422 | B2 | 5/2008 | Fujinaga | |
| 7,391,319 | B1 | 6/2008 | Walker | |
| 7,421,735 | B2 | 9/2008 | Kerstens et al. | |
| 7,437,145 | B2 * | 10/2008 | Hamada | H04L 63/08 455/410 |
| 7,498,985 | B1 | 3/2009 | Woo et al. | |
| 7,526,934 | B2 | 5/2009 | Conforti | |
| 7,600,000 | B2 | 10/2009 | Yao et al. | |
| 7,600,130 | B2 | 10/2009 | Ooi et al. | |
| 7,606,558 | B2 * | 10/2009 | Despain | G07C 9/215 455/410 |
| 7,624,265 | B1 * | 11/2009 | Slyva | H04L 63/08 713/168 |
| 7,624,280 | B2 * | 11/2009 | Oskari | G06F 21/35 713/169 |
| 7,685,629 | B1 | 3/2010 | White et al. | |
| 7,697,920 | B1 * | 4/2010 | McClain | H04L 63/12 455/411 |
| 7,734,293 | B2 * | 6/2010 | Zilliacus | H04W 36/0066 455/445 |
| 7,801,561 | B2 | 9/2010 | Parikh et al. | |
| 7,925,895 | B2 | 4/2011 | Kanazawa et al. | |
| 7,941,579 | B2 | 5/2011 | Uno | |
| 7,979,054 | B2 * | 7/2011 | Baysinger | H04L 63/083 455/411 |
| 8,051,302 | B1 | 11/2011 | Hatanaka et al. | |
| 8,058,971 | B2 * | 11/2011 | Harkins | G07C 9/00571 340/5.73 |
| 8,108,904 | B1 * | 1/2012 | Chickering | H04L 67/34 726/2 |
| 8,151,116 | B2 * | 4/2012 | van der Horst | G06F 21/42 713/185 |
| 8,160,567 | B2 * | 4/2012 | Opaluch | H04M 11/04 455/420 |
| 8,171,303 | B2 * | 5/2012 | Bronstein | H04L 63/18 713/185 |
| 8,229,852 | B2 | 7/2012 | Carlson | |
| 8,311,517 | B2 * | 11/2012 | Brass | H04L 67/02 455/414.1 |
| 8,316,226 | B1 * | 11/2012 | Kshirsagar | H04L 63/0272 713/150 |
| 8,332,650 | B2 | 12/2012 | Banes et al. | |
| 8,434,133 | B2 * | 4/2013 | Kulkarni | G06F 21/42 726/7 |
| 8,474,028 | B2 * | 6/2013 | Kulkarni | H04L 63/18 726/9 |
| 8,560,457 | B2 * | 10/2013 | Obrea | G06F 21/42 705/67 |
| 8,639,873 | B1 * | 1/2014 | Jevans | G06F 21/31 711/104 |
| 8,683,550 | B2 * | 3/2014 | Hung | H04W 12/08 726/2 |
| 8,832,440 | B2 | 9/2014 | Johnson et al. | |
| 8,988,187 | B2 | 3/2015 | Wong et al. | |
| 9,002,800 | B1 * | 4/2015 | Yueh | G06F 11/1448 707/661 |
| 9,049,010 | B2 | 6/2015 | Jueneman et al. | |
| 9,075,571 | B2 | 7/2015 | Bolotin et al. | |
| 9,087,246 | B1 | 7/2015 | Chin et al. | |
| 9,208,242 | B2 * | 12/2015 | Kindberg | G06F 16/9554 |
| 9,262,611 | B2 | 2/2016 | Johnson et al. | |
| 9,591,693 | B2 * | 3/2017 | Stroud | H04B 5/0031 |
| 9,604,651 | B1 | 3/2017 | Amireddy et al. | |
| 9,811,958 | B1 | 11/2017 | Hall et al. | |
| 9,813,416 | B2 | 11/2017 | Bolotin et al. | |
| 9,893,892 | B2 * | 2/2018 | Priebatsch | G06F 21/31 |
| 9,900,305 | B2 | 2/2018 | Levergood et al. | |
| 9,960,916 | B2 * | 5/2018 | Corndorf | H04L 9/0891 |
| 10,037,525 | B2 | 7/2018 | Neafsey | |
| 10,146,706 | B2 | 12/2018 | Bolotin et al. | |
| 10,181,055 | B2 | 1/2019 | Bolotin et al. | |
| 10,498,399 | B1 | 12/2019 | Kamkar et al. | |
| 10,754,992 | B2 | 8/2020 | Bolotin et al. | |
| 10,778,417 | B2 | 9/2020 | Bolotin et al. | |
| 10,783,232 | B2 | 9/2020 | Bolotin et al. | |
| 10,985,909 | B2 | 4/2021 | Bolotin et al. | |
| 2001/0034714 | A1 | 10/2001 | Terao et al. | |
| 2001/0051996 | A1 | 12/2001 | Cooper et al. | |
| 2002/0023198 | A1 * | 2/2002 | Kokubun | G06F 11/1471 711/162 |
| 2002/0023215 | A1 | 2/2002 | Wang et al. | |
| 2002/0025803 | A1 | 2/2002 | Park | |
| 2002/0032039 | A1 | 3/2002 | Kimata | |
| 2002/0052193 | A1 | 5/2002 | Chetty | |
| 2002/0081995 | A1 * | 6/2002 | Leppinen | H04L 29/06 455/412.1 |
| 2002/0082917 | A1 | 6/2002 | Takano | |
| 2002/0094777 | A1 * | 7/2002 | Cannon | H04W 12/06 455/41.2 |
| 2002/0099661 | A1 * | 7/2002 | Kii | G06Q 30/06 705/51 |
| 2002/0136407 | A1 | 9/2002 | Denning et al. | |

(56) References Cited

U.S. PATENT DOCUMENTS

| | | | |
|---|---|---|---|
| 2002/0147525 A1* | 10/2002 | Cayne | G07C 9/257 700/214 |
| 2002/0156921 A1* | 10/2002 | Dutta | H04L 29/06 709/246 |
| 2002/0169988 A1* | 11/2002 | Vandergeest | H04L 63/0823 726/4 |
| 2002/0176385 A1* | 11/2002 | Huh | H04B 1/715 370/335 |
| 2002/0178370 A1* | 11/2002 | Gurevich | G06F 21/606 713/189 |
| 2002/0178385 A1 | 11/2002 | Dent et al. | |
| 2002/0179622 A1* | 12/2002 | Mase | E05B 19/0005 221/9 |
| 2002/0184652 A1* | 12/2002 | Cezeaux | H04N 21/4532 725/132 |
| 2002/0194470 A1 | 12/2002 | Grupe | |
| 2002/0194476 A1 | 12/2002 | Lewis et al. | |
| 2002/0194500 A1* | 12/2002 | Bajikar | H04W 12/08 726/35 |
| 2003/0006879 A1 | 1/2003 | Kang et al. | |
| 2003/0025589 A1 | 2/2003 | Koike | |
| 2003/0046593 A1* | 3/2003 | Xie | G06F 21/80 726/33 |
| 2003/0048174 A1 | 3/2003 | Stevens et al. | |
| 2003/0093693 A1* | 5/2003 | Blight | H04W 12/06 726/4 |
| 2003/0106935 A1* | 6/2003 | Burchette, Jr. | G07F 7/0866 235/380 |
| 2003/0108205 A1 | 6/2003 | Joyner et al. | |
| 2003/0109218 A1 | 6/2003 | Pourkeramati et al. | |
| 2003/0112977 A1 | 6/2003 | Ray et al. | |
| 2003/0128822 A1 | 7/2003 | Leivo et al. | |
| 2003/0158891 A1 | 8/2003 | Lei et al. | |
| 2003/0172269 A1 | 9/2003 | Newcombe | |
| 2003/0176218 A1 | 9/2003 | Lemay et al. | |
| 2003/0188207 A1 | 10/2003 | Schelling | |
| 2003/0191955 A1 | 10/2003 | Wagner et al. | |
| 2003/0212607 A1 | 11/2003 | Chu et al. | |
| 2003/0226011 A1 | 12/2003 | Kuwano et al. | |
| 2003/0226025 A1 | 12/2003 | Lin et al. | |
| 2004/0009815 A1 | 1/2004 | Zotto et al. | |
| 2004/0023642 A1* | 2/2004 | Tezuka | H04L 63/0823 455/411 |
| 2004/0044897 A1 | 3/2004 | Lim | |
| 2004/0046017 A1 | 3/2004 | Sueyoshi et al. | |
| 2004/0073792 A1* | 4/2004 | Noble | G06F 21/35 713/168 |
| 2004/0073796 A1 | 4/2004 | Kang et al. | |
| 2004/0078568 A1* | 4/2004 | Pham | G06F 21/6218 713/165 |
| 2004/0081110 A1 | 4/2004 | Koskimies | |
| 2004/0097217 A1* | 5/2004 | McClain | H04W 12/069 455/411 |
| 2004/0103288 A1* | 5/2004 | Ziv | H04L 9/0894 713/185 |
| 2004/0103345 A1 | 5/2004 | Dunstan | |
| 2004/0106433 A1* | 6/2004 | Ooki | H04M 15/49 455/561 |
| 2004/0122907 A1* | 6/2004 | Chou | H04L 67/26 709/207 |
| 2004/0139207 A1 | 7/2004 | De | |
| 2004/0142709 A1 | 7/2004 | Coskun et al. | |
| 2004/0143730 A1 | 7/2004 | Wen et al. | |
| 2004/0162076 A1 | 8/2004 | Chowdry et al. | |
| 2004/0172538 A1 | 9/2004 | Satoh et al. | |
| 2004/0198430 A1 | 10/2004 | Moriyama et al. | |
| 2004/0203602 A1 | 10/2004 | Karaoguz et al. | |
| 2004/0235514 A1* | 11/2004 | Bloch | G06F 1/163 455/550.1 |
| 2004/0236918 A1* | 11/2004 | Okaue | G06F 21/31 711/164 |
| 2004/0236919 A1* | 11/2004 | Okaue | G06F 21/78 711/164 |
| 2004/0236939 A1 | 11/2004 | Watanabe et al. | |
| 2004/0240411 A1 | 12/2004 | Suzuki | |
| 2004/0259545 A1 | 12/2004 | Morita | |
| 2005/0021959 A1 | 1/2005 | Tsushima et al. | |
| 2005/0036509 A1 | 2/2005 | Acharya et al. | |
| 2005/0044404 A1* | 2/2005 | Bhansali | G06F 21/88 726/26 |
| 2005/0060555 A1 | 3/2005 | Raghunath et al. | |
| 2005/0080903 A1 | 4/2005 | Valenci | |
| 2005/0097320 A1 | 5/2005 | Golan et al. | |
| 2005/0114689 A1 | 5/2005 | Strom et al. | |
| 2005/0138377 A1 | 6/2005 | First et al. | |
| 2005/0152305 A1 | 7/2005 | Ji et al. | |
| 2005/0184145 A1 | 8/2005 | Law et al. | |
| 2005/0206353 A1* | 9/2005 | Sengoku | G06F 21/78 323/210 |
| 2005/0210271 A1* | 9/2005 | Chou | G06F 21/32 713/186 |
| 2005/0210283 A1 | 9/2005 | Kato | |
| 2005/0210380 A1 | 9/2005 | Kramer et al. | |
| 2005/0219036 A1 | 10/2005 | Ueda et al. | |
| 2005/0226423 A1 | 10/2005 | Li et al. | |
| 2005/0270139 A1 | 12/2005 | Park et al. | |
| 2005/0273817 A1* | 12/2005 | Rodriguez | H04N 21/235 725/46 |
| 2005/0283614 A1* | 12/2005 | Hardt | H04L 63/0823 713/182 |
| 2005/0288060 A1* | 12/2005 | Kojima | H04W 88/085 455/561 |
| 2006/0005023 A1* | 1/2006 | Homer | G06F 21/34 713/168 |
| 2006/0007897 A1 | 1/2006 | Ishii | |
| 2006/0026689 A1 | 2/2006 | Barker et al. | |
| 2006/0041750 A1 | 2/2006 | Carter et al. | |
| 2006/0047961 A1 | 3/2006 | Hashimoto et al. | |
| 2006/0048236 A1* | 3/2006 | Multerer | G06F 21/121 726/28 |
| 2006/0052085 A1 | 3/2006 | Gregrio et al. | |
| 2006/0063590 A1* | 3/2006 | Abassi | A63F 13/332 463/29 |
| 2006/0064757 A1 | 3/2006 | Poslinski | |
| 2006/0069711 A1* | 3/2006 | Tsunekawa | G06F 11/1464 709/200 |
| 2006/0085644 A1 | 4/2006 | Isozaki et al. | |
| 2006/0085847 A1* | 4/2006 | Ikeuchi | G06F 21/35 726/6 |
| 2006/0105740 A1 | 5/2006 | Puranik | |
| 2006/0105749 A1 | 5/2006 | Han et al. | |
| 2006/0123056 A1* | 6/2006 | Darbha | H04L 63/08 |
| 2006/0128305 A1* | 6/2006 | Delalat | G08B 13/1418 455/41.2 |
| 2006/0129829 A1* | 6/2006 | Aaron | G06F 21/35 713/182 |
| 2006/0133606 A1 | 6/2006 | Eberwein et al. | |
| 2006/0135065 A1 | 6/2006 | Lee et al. | |
| 2006/0141986 A1 | 6/2006 | Shinozaki | |
| 2006/0152374 A1 | 7/2006 | Singer et al. | |
| 2006/0161749 A1 | 7/2006 | Chen et al. | |
| 2006/0170533 A1* | 8/2006 | Chioiu | G07C 9/27 340/5.61 |
| 2006/0176146 A1* | 8/2006 | Krishan | G06F 21/34 340/5.53 |
| 2006/0179304 A1* | 8/2006 | Han | G06Q 30/04 713/168 |
| 2006/0190724 A1* | 8/2006 | Adams | G06F 21/71 713/166 |
| 2006/0200305 A1 | 9/2006 | Sheha et al. | |
| 2006/0200681 A1* | 9/2006 | Kato | G06F 21/34 713/193 |
| 2006/0206709 A1* | 9/2006 | Labrou | G06Q 20/4014 713/167 |
| 2006/0206720 A1* | 9/2006 | Harada | H04L 63/02 713/182 |
| 2006/0233374 A1 | 10/2006 | Adams et al. | |
| 2006/0236105 A1* | 10/2006 | Brok | H04W 12/50 713/169 |

(56) References Cited

U.S. PATENT DOCUMENTS

| | | | |
|---|---|---|---|
| 2006/0236363 A1* | 10/2006 | Heard | H04L 9/083 726/1 |
| 2006/0240806 A1* | 10/2006 | Demirbasa | G08B 21/0277 455/412.1 |
| 2006/0248599 A1 | 11/2006 | Sack et al. | |
| 2006/0265605 A1* | 11/2006 | Ramezani | G06F 21/78 713/193 |
| 2006/0267936 A1 | 11/2006 | Hoerl et al. | |
| 2006/0271789 A1* | 11/2006 | Satomura | G06F 21/41 713/183 |
| 2006/0281441 A1 | 12/2006 | Okochi | |
| 2007/0011724 A1 | 1/2007 | Gonzalez et al. | |
| 2007/0015589 A1 | 1/2007 | Shimizu et al. | |
| 2007/0016743 A1* | 1/2007 | Jevans | G06F 21/31 711/164 |
| 2007/0050622 A1* | 3/2007 | Rager | H04L 9/3271 713/168 |
| 2007/0050643 A1 | 3/2007 | Negishi | |
| 2007/0053308 A1* | 3/2007 | DuMas | H04L 45/00 370/254 |
| 2007/0066280 A1 | 3/2007 | Arai | |
| 2007/0073937 A1* | 3/2007 | Feinberg | H04N 1/00151 710/62 |
| 2007/0088521 A1 | 4/2007 | Shmueli et al. | |
| 2007/0092082 A1 | 4/2007 | Rush | |
| 2007/0098176 A1 | 5/2007 | Song | |
| 2007/0100771 A1 | 5/2007 | Eckleder et al. | |
| 2007/0113081 A1* | 5/2007 | Camp | H04L 41/12 713/168 |
| 2007/0115091 A1 | 5/2007 | Bandaru | |
| 2007/0143013 A1 | 6/2007 | Breen et al. | |
| 2007/0149170 A1* | 6/2007 | Bloebaum | H04W 12/06 455/411 |
| 2007/0162963 A1* | 7/2007 | Penet | G06F 21/41 726/5 |
| 2007/0172063 A1* | 7/2007 | Biggs | H04L 51/04 380/255 |
| 2007/0191057 A1* | 8/2007 | Kamada | H04M 1/2757 455/558 |
| 2007/0192488 A1 | 8/2007 | Dacosta | |
| 2007/0192601 A1 | 8/2007 | Spain et al. | |
| 2007/0198856 A1 | 8/2007 | Lee et al. | |
| 2007/0200671 A1 | 8/2007 | Kelley et al. | |
| 2007/0203618 A1* | 8/2007 | McBride | B60R 25/24 701/2 |
| 2007/0220255 A1 | 9/2007 | Igarashi | |
| 2007/0229221 A1 | 10/2007 | Saotome | |
| 2007/0239994 A1 | 10/2007 | Kulkarni et al. | |
| 2007/0244822 A1 | 10/2007 | Hogan | |
| 2007/0248232 A1 | 10/2007 | Driscoll et al. | |
| 2007/0255962 A1 | 11/2007 | Lu et al. | |
| 2007/0264965 A1 | 11/2007 | Taniguchi | |
| 2007/0287418 A1 | 12/2007 | Reddy | |
| 2007/0288386 A1 | 12/2007 | Adachi et al. | |
| 2007/0290797 A1 | 12/2007 | Harkins et al. | |
| 2007/0290798 A1 | 12/2007 | Larson et al. | |
| 2007/0290799 A1 | 12/2007 | Harkins et al. | |
| 2007/0294746 A1* | 12/2007 | Sasakura | B60R 25/2018 726/2 |
| 2007/0300052 A1* | 12/2007 | Jevans | G06F 21/41 713/1 |
| 2007/0300063 A1 | 12/2007 | Adams et al. | |
| 2008/0005577 A1* | 1/2008 | Rager | H04W 12/106 713/183 |
| 2008/0006685 A1* | 1/2008 | Rackley, III | G06Q 40/00 235/379 |
| 2008/0010190 A1* | 1/2008 | Rackley, III | G06Q 20/042 705/39 |
| 2008/0010191 A1* | 1/2008 | Rackley, III | G06Q 20/10 705/39 |
| 2008/0010192 A1* | 1/2008 | Rackley, III | G06Q 20/3223 705/39 |
| 2008/0010193 A1* | 1/2008 | Rackley, III | G06Q 20/3221 705/39 |
| 2008/0010196 A1* | 1/2008 | Rackley, III | G06Q 20/102 705/40 |
| 2008/0010204 A1* | 1/2008 | Rackley, III | G06Q 20/042 705/45 |
| 2008/0010215 A1* | 1/2008 | Rackley, III | G06Q 20/385 705/70 |
| 2008/0010465 A1 | 1/2008 | Shen | |
| 2008/0011827 A1* | 1/2008 | Little | H04W 12/082 235/380 |
| 2008/0014869 A1* | 1/2008 | Demirbasa | H04W 12/082 455/41.2 |
| 2008/0017711 A1* | 1/2008 | Adams | G07F 7/1008 235/439 |
| 2008/0022043 A1* | 1/2008 | Adams | G06K 7/10297 711/115 |
| 2008/0022090 A1 | 1/2008 | Kishimoto | |
| 2008/0028120 A1 | 1/2008 | Mcleod | |
| 2008/0030304 A1 | 2/2008 | Doan et al. | |
| 2008/0034019 A1 | 2/2008 | Cisler et al. | |
| 2008/0034223 A1 | 2/2008 | Funahashi | |
| 2008/0039134 A1* | 2/2008 | Hattori | G06F 21/79 455/556.1 |
| 2008/0040265 A1* | 2/2008 | Rackley, III | G06Q 20/32 705/40 |
| 2008/0041936 A1 | 2/2008 | Vawter | |
| 2008/0041943 A1 | 2/2008 | Radicella et al. | |
| 2008/0041951 A1* | 2/2008 | Adams | G11C 29/08 235/435 |
| 2008/0045177 A1* | 2/2008 | Wise | H04W 8/245 455/403 |
| 2008/0048846 A1 | 2/2008 | Nagai et al. | |
| 2008/0052439 A1 | 2/2008 | Young et al. | |
| 2008/0052765 A1* | 2/2008 | Shinomiya | H04L 63/18 726/3 |
| 2008/0055041 A1* | 3/2008 | Takene | G07C 9/00309 340/5.7 |
| 2008/0070495 A1 | 3/2008 | Stricklen et al. | |
| 2008/0070501 A1 | 3/2008 | Wyld | |
| 2008/0086320 A1 | 4/2008 | Ballew et al. | |
| 2008/0086323 A1 | 4/2008 | Petrie et al. | |
| 2008/0086509 A1 | 4/2008 | Wallace | |
| 2008/0086764 A1* | 4/2008 | Kulkarni | H04L 9/3234 726/7 |
| 2008/0086767 A1* | 4/2008 | Kulkarni | H04L 9/3215 726/9 |
| 2008/0086770 A1* | 4/2008 | Kulkarni | H04L 9/3271 726/20 |
| 2008/0090612 A1 | 4/2008 | Glinka | |
| 2008/0098134 A1* | 4/2008 | Van Acht | G06F 21/78 710/33 |
| 2008/0098225 A1 | 4/2008 | Baysinger | |
| 2008/0114855 A1* | 5/2008 | Welingkar | G07F 17/0014 709/217 |
| 2008/0115141 A1* | 5/2008 | Welingkar | G06F 9/5011 718/104 |
| 2008/0115152 A1* | 5/2008 | Welingkar | H04L 67/34 719/322 |
| 2008/0115226 A1* | 5/2008 | Welingkar | G06F 21/88 726/28 |
| 2008/0120726 A1* | 5/2008 | Tsunehiro | G06F 21/77 726/27 |
| 2008/0120729 A1* | 5/2008 | Eren | G06F 21/78 726/34 |
| 2008/0126145 A1* | 5/2008 | Rackley, III | G06Q 20/102 455/406 |
| 2008/0130575 A1 | 6/2008 | Jun et al. | |
| 2008/0141041 A1 | 6/2008 | Molaro et al. | |
| 2008/0141378 A1 | 6/2008 | Mclean | |
| 2008/0144829 A1 | 6/2008 | Mitsuoka et al. | |
| 2008/0148369 A1 | 6/2008 | Aaron | |
| 2008/0151847 A1* | 6/2008 | Abujbara | G06F 21/335 370/338 |
| 2008/0167002 A1 | 7/2008 | Kim et al. | |
| 2008/0168247 A1* | 7/2008 | Goodwill | G06F 21/80 711/163 |

(56) References Cited

U.S. PATENT DOCUMENTS

| | | | |
|---|---|---|---|
| 2008/0177860 A1* | 7/2008 | Khedouri | H04N 21/47202 709/217 |
| 2008/0195863 A1 | 8/2008 | Kennedy | |
| 2008/0209553 A1 | 8/2008 | Lu et al. | |
| 2008/0212771 A1 | 9/2008 | Hauser | |
| 2008/0212783 A1 | 9/2008 | Oba | |
| 2008/0214215 A1* | 9/2008 | Aaltonen | G06F 16/9577 455/466 |
| 2008/0215841 A1* | 9/2008 | Bolotin | G06F 21/44 711/164 |
| 2008/0216153 A1* | 9/2008 | Aaltonen | H04L 63/083 726/3 |
| 2008/0222734 A1* | 9/2008 | Redlich | H04L 63/02 726/26 |
| 2008/0238669 A1 | 10/2008 | Linford | |
| 2008/0252415 A1 | 10/2008 | Larson et al. | |
| 2008/0261560 A1 | 10/2008 | Ruckart | |
| 2008/0263363 A1 | 10/2008 | Jueneman et al. | |
| 2008/0267404 A1 | 10/2008 | Budde et al. | |
| 2008/0274718 A1 | 11/2008 | Roper | |
| 2008/0287067 A1 | 11/2008 | Kawamura et al. | |
| 2008/0303631 A1 | 12/2008 | Beekley et al. | |
| 2008/0313082 A1* | 12/2008 | Van Bosch | G06Q 20/20 705/50 |
| 2008/0320600 A1* | 12/2008 | Pandiscia | H04L 9/3297 726/27 |
| 2009/0025435 A1 | 1/2009 | Popowski | |
| 2009/0034731 A1 | 2/2009 | Oshima | |
| 2009/0036164 A1 | 2/2009 | Rowley | |
| 2009/0037748 A1 | 2/2009 | Kim et al. | |
| 2009/0040028 A1* | 2/2009 | Price | G06F 16/113 340/10.51 |
| 2009/0052393 A1 | 2/2009 | Sood et al. | |
| 2009/0054104 A1* | 2/2009 | Borean | H04L 63/0853 455/558 |
| 2009/0063802 A1* | 3/2009 | Johnson | G06F 21/31 711/164 |
| 2009/0063851 A1 | 3/2009 | Nijdam | |
| 2009/0070857 A1 | 3/2009 | Azuma | |
| 2009/0083449 A1 | 3/2009 | Mashinsky | |
| 2009/0097719 A1 | 4/2009 | Lim | |
| 2009/0119754 A1* | 5/2009 | Schubert | H04L 63/205 726/4 |
| 2009/0178144 A1* | 7/2009 | Redlich | G06F 21/6209 726/27 |
| 2009/0182931 A1* | 7/2009 | Gill | G06F 21/88 711/103 |
| 2009/0187720 A1* | 7/2009 | Hong | G06F 11/1458 711/162 |
| 2009/0193517 A1 | 7/2009 | Machiyama | |
| 2009/0232312 A1 | 9/2009 | Inoue et al. | |
| 2009/0300710 A1 | 12/2009 | Chai et al. | |
| 2009/0307489 A1 | 12/2009 | Endoh | |
| 2010/0015942 A1* | 1/2010 | Huang | H04W 8/245 455/404.1 |
| 2010/0031336 A1* | 2/2010 | Dumont | G06F 21/32 726/9 |
| 2010/0135491 A1* | 6/2010 | Bhuyan | H04W 12/04 380/247 |
| 2010/0138908 A1 | 6/2010 | Vennelakanti et al. | |
| 2010/0159852 A1 | 6/2010 | Kakaire | |
| 2010/0250937 A1* | 9/2010 | Blomquist | H04L 9/14 713/170 |
| 2010/0251358 A1* | 9/2010 | Kobayashi | G06F 21/79 726/18 |
| 2010/0253508 A1 | 10/2010 | Koen et al. | |
| 2010/0274859 A1* | 10/2010 | Bucuk | H04L 63/0492 709/206 |
| 2010/0287373 A1 | 11/2010 | Johnson et al. | |
| 2011/0035788 A1 | 2/2011 | White et al. | |
| 2011/0060921 A1 | 3/2011 | Michael | |
| 2011/0231911 A1 | 9/2011 | White et al. | |
| 2011/0313922 A1 | 12/2011 | Ben Ayed | |
| 2012/0226912 A1* | 9/2012 | King | G06F 21/31 713/183 |
| 2012/0233681 A1* | 9/2012 | Adams | G06F 1/1632 726/7 |
| 2012/0234058 A1 | 9/2012 | Neil et al. | |
| 2012/0254602 A1* | 10/2012 | Bhansali | G06F 9/4406 713/2 |
| 2013/0010962 A1 | 1/2013 | Buer et al. | |
| 2013/0061315 A1* | 3/2013 | Jevans | G06F 21/79 726/17 |
| 2013/0073406 A1 | 3/2013 | Gazdzinski | |
| 2013/0214935 A1 | 8/2013 | Kim et al. | |
| 2013/0237193 A1 | 9/2013 | Dumas et al. | |
| 2013/0269026 A1* | 10/2013 | Deluca | H04L 63/0853 726/19 |
| 2013/0283049 A1* | 10/2013 | Brown | G06F 21/86 713/165 |
| 2014/0109203 A1* | 4/2014 | Pemmaraju | H04L 63/0861 726/5 |
| 2014/0120905 A1 | 5/2014 | Kim | |
| 2014/0265359 A1 | 9/2014 | Cheng et al. | |
| 2014/0282877 A1* | 9/2014 | Mahaffey | H04W 12/08 726/3 |
| 2014/0372743 A1* | 12/2014 | Rogers | H04W 12/126 713/2 |
| 2015/0058624 A1 | 2/2015 | Borisov et al. | |
| 2015/0102899 A1 | 4/2015 | Kim et al. | |
| 2015/0199863 A1 | 7/2015 | Scoggins et al. | |
| 2015/0278125 A1 | 10/2015 | Bolotin et al. | |
| 2016/0035163 A1* | 2/2016 | Conrad | H04W 12/0433 340/5.61 |
| 2016/0036594 A1* | 2/2016 | Conrad | H04L 9/3271 713/185 |
| 2016/0036788 A1* | 2/2016 | Conrad | H04W 12/06 713/168 |
| 2016/0036814 A1* | 2/2016 | Conrad | H04L 63/0428 713/171 |
| 2016/0042581 A1 | 2/2016 | Ku | |
| 2016/0098874 A1 | 4/2016 | Handville et al. | |
| 2016/0104334 A1 | 4/2016 | Handville et al. | |
| 2016/0119339 A1 | 4/2016 | Bolotin et al. | |
| 2016/0180618 A1 | 6/2016 | Ho et al. | |
| 2016/0239001 A1 | 8/2016 | Chin et al. | |
| 2016/0259736 A1 | 9/2016 | Bolotin et al. | |
| 2016/0277439 A1* | 9/2016 | Rotter | H04L 63/0861 |
| 2016/0337863 A1* | 11/2016 | Robinson | H04W 4/021 |
| 2016/0343181 A1 | 11/2016 | Cheng et al. | |
| 2016/0343185 A1 | 11/2016 | Dumas | |
| 2017/0017810 A1 | 1/2017 | Bolotin et al. | |
| 2017/0032602 A1 | 2/2017 | Cheng et al. | |
| 2017/0053467 A1 | 2/2017 | Meganck et al. | |
| 2017/0070345 A9 | 3/2017 | Lee et al. | |
| 2017/0075636 A1* | 3/2017 | Chang | G06F 3/122 |
| 2017/0109952 A1 | 4/2017 | Johnson | |
| 2017/0136990 A1 | 5/2017 | Tercero | |
| 2017/0169679 A1 | 6/2017 | Johnson et al. | |
| 2017/0191287 A1 | 7/2017 | Mittleman et al. | |
| 2017/0214528 A1* | 7/2017 | Priebatsch | G06F 21/34 |
| 2017/0243420 A1 | 8/2017 | Lien | |
| 2017/0243425 A1 | 8/2017 | Meganck et al. | |
| 2017/0352215 A1 | 12/2017 | Maiwand et al. | |
| 2017/0372550 A1 | 12/2017 | Lin | |
| 2018/0009416 A1 | 1/2018 | Maiwand et al. | |
| 2018/0013815 A1 | 1/2018 | Gold | |
| 2018/0096546 A1 | 4/2018 | Bartels | |
| 2018/0114387 A1 | 4/2018 | Klink et al. | |
| 2018/0114389 A1 | 4/2018 | Geiszler | |
| 2018/0248704 A1 | 8/2018 | Coode et al. | |
| 2018/0262336 A1 | 9/2018 | Fujiwara et al. | |
| 2018/0268633 A1 | 9/2018 | Kwon et al. | |
| 2018/0307869 A1 | 10/2018 | Bolotin et al. | |
| 2018/0357406 A1 | 12/2018 | Bolotin et al. | |
| 2019/0001925 A1 | 1/2019 | Arakawa et al. | |
| 2019/0007203 A1 | 1/2019 | Bolotin et al. | |
| 2019/0012860 A1 | 1/2019 | Lee et al. | |
| 2019/0035189 A1 | 1/2019 | Miyamoto et al. | |
| 2019/0066415 A1 | 2/2019 | Pang et al. | |
| 2019/0073842 A1 | 3/2019 | Lee et al. | |

(56) References Cited

U.S. PATENT DOCUMENTS

| | | | |
|---|---|---|---|
| 2019/0130673 | A1 | 5/2019 | Beck |
| 2019/0147676 | A1 | 5/2019 | Madzhunkov et al. |
| 2019/0205818 | A1 | 7/2019 | Sakurada et al. |
| 2019/0289553 | A1 | 9/2019 | Kincaid et al. |
| 2019/0297134 | A1 | 9/2019 | Gold |
| 2019/0304227 | A1 | 10/2019 | Chen |
| 2019/0325677 | A1 | 10/2019 | Lingala et al. |
| 2019/0385392 | A1 | 12/2019 | Cho et al. |
| 2020/0013238 | A1 | 1/2020 | Shimano |
| 2020/0043271 | A1 | 2/2020 | Anderson et al. |
| 2020/0051351 | A1 | 2/2020 | Shin |
| 2020/0052905 | A1 | 2/2020 | Mathias et al. |
| 2020/0156591 | A1 | 5/2020 | Arakawa et al. |
| 2020/0296585 | A1 | 9/2020 | Bolotin et al. |
| 2020/0328880 | A1 | 10/2020 | Bolotin et al. |
| 2020/0366470 | A1 | 11/2020 | Bolotin et al. |

FOREIGN PATENT DOCUMENTS

| | | |
|---|---|---|
| CN | 108604982 B | 9/2020 |
| CN | 112054892 | 12/2020 |
| GB | 2562923 B | 2/2020 |
| GB | 2580549 B | 12/2020 |
| JP | 2004326763 A | 11/2004 |
| JP | 2006139757 A | 6/2006 |
| JP | 2006251857 A | 9/2006 |
| JP | 2009524880 A | 7/2009 |
| JP | 2013515296 A | 5/2013 |
| JP | 2014530562 A | 11/2014 |
| JP | 2019511791 A | 4/2019 |
| JP | 6633228 B2 | 12/2019 |
| JP | 2020057412 A | 4/2020 |
| KR | 1020010106325 A | 11/2001 |
| KR | 1020050023050 A | 3/2005 |
| KR | 102054711 B1 | 12/2019 |
| KR | 102201093 B1 | 1/2021 |
| TW | 583568 B | 4/2004 |
| TW | I252701 B | 4/2006 |
| TW | 200715801 A | 4/2007 |
| TW | 200915074 | 4/2009 |
| TW | 201530338 | 8/2015 |
| TW | 201546729 | 12/2015 |
| TW | 537732 B | 6/2016 |
| TW | 201737151 A | 10/2017 |
| TW | 202016779 A | 5/2020 |
| TW | I692704 B | 5/2020 |
| TW | 202029042 A | 8/2020 |
| WO | WO-2006041569 A2 | 4/2006 |
| WO | WO-2009042820 | 4/2009 |
| WO | WO-2017123433 A1 | 7/2017 |
| WO | WO-2020037053 A1 | 2/2020 |

OTHER PUBLICATIONS

"U.S. Appl. No. 16/987,834, Response filed Oct. 16, 2020 to Non Final Office Action dated Sep. 1, 2020", 12 pgs.
"U.S. Appl. No. 16/987,834, Final Office Action dated Nov. 5, 2020", 18 pgs.
"Taiwanese Application Serial No. 109109809, Office Action dated Oct. 8, 2020", w/ English Translation, 36 pgs.
"U.S. Appl. No. 16/987,834, Response filed Dec. 3, 2020 to Final Office Action dated Nov. 5, 2020", 15 pgs.
"U.S. Appl. No. 16/987,834, Notice of Allowance dated Dec. 24, 2020", 16 pgs.
U.S. Appl. No. 12/680,742 U.S. Pat. No. 9,262,611, filed Mar. 29, 2010, Data Security System With Encryption.
U.S. Appl. No. 14/987,678 U.S. Pat. No. 9,813,416, filed Jan. 4, 2016, Data Security System With Encryption.
U.S. Appl. No. 14/987,749 U.S. Pat. No. 10,181,055, filed Jan. 4, 2016, Data Security System With Encryption.
U.S. Appl. No. 16/103,979 U.S. Pat. No. 10,778,417, filed Aug. 16, 2018, Self-Encrypting Module With Embedded Wireless User Authentication.
U.S. Appl. No. 16/021,547 U.S. Pat. No. 10,754,992, filed Jun. 28, 2018, Self-Encrypting Drive.
U.S. Appl. No. 16/915,664, filed Jun. 29, 2020, Module With Embedded Wireless User Authentication.
U.S. Appl. No. 16/987,834, filed Aug. 7, 2020, Door Lock Control with Wireless User Authentication.
U.S. Appl. No. 16/103,983 U.S. Pat. No. 10,783,232, filed Aug. 16, 2018, Management System for Self-Encrypting Managed Devices With Embedded Wireless User Authentication.
U.S. Appl. No. 16/888,230, filed May 29, 2020, Wireless Authentication System.
"U.S. Appl. No. 12/680,742, Advisory Action dated Jan. 27, 2015", 3 pgs.
"U.S. Appl. No. 12/680,742, Advisory Action dated Dec. 19, 2013", 3 pgs.
"U.S. Appl. No. 12/680,742, Final Office Action dated Sep. 27, 2013", 13 pgs.
"U.S. Appl. No. 12/680,742, Final Office Action dated Oct. 28, 2014", 16 pgs.
"U.S. Appl. No. 12/680,742, Non Final Office Action dated Mar. 12, 2013", 12 pgs.
"U.S. Appl. No. 12/680,742, Non Final Office Action dated Mar. 27, 2015", 15 pgs.
"U.S. Appl. No. 12/680,742, Non Final Office Action dated Apr. 7, 2014", 14 pgs.
"U.S. Appl. No. 12/680,742, Notice of Allowance dated Oct. 1, 2015", 8 pgs.
"U.S. Appl. No. 12/680,742, Preliminary Amendment filed Jun. 5, 2012", 2 pgs.
"U.S. Appl. No. 12/680,742, Response filed Jun. 12, 2013 to Non Final Office Action dated Mar. 12, 2013", 16 pgs.
"U.S. Appl. No. 12/680,742, Response filed Jun. 29, 2015 to Non Final Office Action dated Mar. 27, 2015", 14 pgs.
"U.S. Appl. No. 12/680,742, Response filed Jul. 7, 2014 to Non Final Office Action dated Apr. 7, 2014", 20 pgs.
"U.S. Appl. No. 12/680,742, Response filed Nov. 27, 2013 to Final Office Action dated Sep. 27, 2013", 15 pgs.
"U.S. Appl. No. 12/680,742, Response filed Dec. 29, 2014 to Final Office Action dated Oct. 28, 2014", 16 pgs.
"U.S. Appl. No. 14/987,678, 312 Amendment filed Sep. 5, 2017", 3 pgs.
"U.S. Appl. No. 14/987,678, Non Final Office Action dated Feb. 10, 2017", 11 pgs.
"U.S. Appl. No. 14/987,678, Notice of Allowance dated Aug. 10, 2017", 9 pgs.
"U.S. Appl. No. 14/987,678, PTO Response to Rule 312 Communication dated Sep. 11, 2017", 2 pgs.
"U.S. Appl. No. 14/987,678, Response filed Jun. 21, 2017 to Non Final Office Action dated Feb. 10, 2017", 9 pgs.
"U.S. Appl. No. 14/987,749, Examiner Interview Summary dated Sep. 10, 2018", 2 pgs.
"U.S. Appl. No. 14/987,749, Final Office Action dated Feb. 22, 2018", 15 pgs.
"U.S. Appl. No. 14/987,749, Non Final Office Action dated Jun. 7, 2018", 11 pgs.
"U.S. Appl. No. 14/987,749, Non Final Office Action dated Aug. 10, 2017", 12 pgs.
"U.S. Appl. No. 14/987,749, Notice of Allowance dated Sep. 27, 2018", 14 pgs.
"U.S. Appl. No. 14/987,749, Response filed May 4, 2018 to Final Office Action dated Feb. 22, 2018", 21 pgs.
"U.S. Appl. No. 14/987,749, Response filed Sep. 11, 2018 to Non Final Office Action dated Jun. 7, 2018", 12 pgs.
"U.S. Appl. No. 14/987,749, Response filed Nov. 10, 2017 to Non Final Office Action dated Aug. 10, 2017", 14 pgs.
"U.S. Appl. No. 16/021,547, Final Office Action dated Feb. 3, 2020", 17 pgs.
"U.S. Appl. No. 16/021,547, Non Final Office Action dated Aug. 7, 2019", 16 pgs.
"U.S. Appl. No. 16/021,547, Notice of Allowance dated Apr. 22, 2020", 17 pgs.
"U.S. Appl. No. 16/021,547, Response filed Mar. 31, 2020 to Final Office Action dated Feb. 3, 2020", 17 pgs.

(56) References Cited

OTHER PUBLICATIONS

"U.S. Appl. No. 16/021,547, Response filed Nov. 7, 2019 to Non Final Office Action dated Aug. 7, 2019", 16 pgs.
"U.S. Appl. No. 16/103,979, Non Final Office Action dated Oct. 2, 2019", 14 pgs.
"U.S. Appl. No. 16/103,979, Response filed Dec. 5, 2019 to Non Final Office Action dated Oct. 2, 2019", 15 pgs.
"U.S. Appl. No. 16/103,983, Non Final Office Action dated Sep. 5, 2019", 16 pgs.
"U.S. Appl. No. 16/103,983, Response filed Dec. 3, 2019 to Non Final Office Action mailed", 19 pgs.
"Chinese Application Serial No. 201780005638.6, Office Action dated Jul. 2, 2019", w/ English Translation, 15 pgs.
"Chinese Application Serial No. 201780005638.6, Response filed Nov. 6, 2019 to Office Action dated Jul. 2, 2019", w/ English Claims, 18 pgs.
"Chinese Application Serial No. 201780005638.6, Voluntary Amendment filed Apr. 1, 2019", w/ English Claims, 19 pgs.
"International Application Serial No. PCT/US2008/077766, International Preliminary Report on Patentability dated Mar. 30, 2010", 8 pgs.
"International Application Serial No. PCT/US2008/077766, International Search Report dated Mar. 31, 2009", 3 pgs
"International Application Serial No. PCT/US2008/077766, Written Opinion dated Mar. 31, 2009", 7 pgs.
"International Application Serial No. PCT/US2017/012060, International Preliminary Report on Patentability dated Jul. 19, 2018", 8 pgs.
"International Application Serial No. PCT/US2017/012060, International Search Report Mar. 27, 2017", 2 pgs.
"International Application Serial No. PCT/US2017/012060, Written Opinion dated Mar. 27, 2017", 6 pgs.
"International Application Serial No. PCT/US2019/046522, International Search Report dated Oct. 17, 2019", 5 pgs.
"International Application Serial No. PCT/US2019/046522, Written Opinion dated Oct. 17, 2019", 7 pgs.
"Japanese Application Serial No. 2018-553854, Notification of Reasons for Refusal dated Aug. 6, 2019", w/ English Translation, 6 pgs.
"Japanese Application Serial No. 2018-553854, Response filed Oct. 28, 2019 to Notification of Reasons for Refusal dated Aug. 6, 2019", w/ English Claims, 12 pgs.
"Taiwanese Application Serial No. 106100149, First Office Action dated Sep. 20, 2019", English Translation, 7 pgs.
"Taiwanese Application Serial No. 106100149, Response filed Dec. 18, 2019 to First Office Action dated Sep. 20, 2019", w/ Amendment in English, 15 pgs.
"Taiwanese Application Serial No. 106100149, Voluntary Amendment filed Aug. 6, 2019", w/ English Claims, 26 pgs.
"United Kingdom Application Serial No. 1811137.7, Examination Report under Section 18(3) dated Aug. 12, 2019", 2 pgs.
"United Kingdom Application Serial No. 1811137.7, Response filed Oct. 14, 2019 to Examination Report under Section 18(3) dated Aug. 12, 2019", 36 pgs.
"U.S. Appl. No. 16/103,979, Final Office Action dated Feb. 28, 2020", 12 pgs.
"U.S. Appl. No. 16/103,979, Notice of Allowance dated May 7, 2020", 16 pgs.
"U.S. Appl. No. 16/103,979, Response filed Apr. 28, 2020 to Final Office Action dated Feb. 28, 2020", 8 pgs.
"U.S. Appl. No. 16/103,983, Final Office Action dated Mar. 10, 2020", 11 pgs.
"U.S. Appl. No. 16/103,983, Notice of Allowance dated Jun. 2, 2020", 15 pgs.
"U.S. Appl. No. 16/103,983, Response filed Apr. 27, 2020 to Final Office Action dated Mar. 10, 2020", 8 pgs.
"U.S. Appl. No. 16/987,834, Non Final Office Action dated Sep. 1, 2020", 14 pgs.
"Chinese Application Serial No. 201780005638.6, Office Action dated Feb. 3, 2020", w/ English Translation, 8 pgs.
"Chinese Application Serial No. 201780005638.6, Response filed Apr. 2, 2020 to Office Action dated Feb. 3, 2020", w/ English Claims, 31 pgs.
"Chinese Application Serial No. 201780005638.6, Response filed Apr. 21, 2020 to Examiner Interview", w/ English Claims, 12 pgs.
"Korean Application Serial No. 10-2019-7035893, Notice of Preliminary Rejection dated Jun. 24, 2020", w/ English Translation, 8 pgs.
"Korean Application Serial No. 10-2019-7035893, Response filed Aug. 24, 2020 to Notice of Preliminary Rejection dated Jun. 24, 2020", w/ English Claims, 29 pgs.
"Taiwanese Application Serial No. 108129258, Voluntary Amendment filed Mar. 19, 2020", w/ English Claims, 63 pgs.
"United Kingdom Application Serial No. 1811137.7, Voluntary Amendment Filed May 15, 2019", 14 pgs.
"Untied Kingdom Application Serial No. 1811137.7, Voluntary Amendment Filed Jun. 25, 2019", 13 pgs.
"United Kingdom Application Serial No. 1919421.6, Response filed May 29, 2020 to Combined Search and Examination Report under Sections 17 and 18(3) dated May 11, 2020", 23 pgs.
"United Kingdom Application Serial No. 1919421.6, Response filed Jun. 17, 2020 to Subsequent Examination Report under Section 18(3) dated Jun. 2, 2020", 10 pgs.
"United Kingdom Application Serial No. 1919421.6, Subsequent Examination Report Section 18(3) dated Jun. 2, 2020", 3 pgs.
"U.S. Appl. No. 16/888,230, Non Final Office Action dated Mar. 9, 2021", 21 pgs.
"U.S. Appl. No. 16/915,664, Non Final Office Action dated Apr. 1, 2021", 19 pgs.
"International Application Serial No. PCT/US2019/046522, International Preliminary Report on Patentability dated Feb. 25, 2021", 9 pgs.
"Japanese Application Serial No. 2019-223413, Notification of Reasons for Refusal dated Mar. 2, 2021", w/ English Translation, 8 pgs.
"Taiwanese Application Serial No. 108129258, Office Action dated Feb. 3, 2021", w/ English Translation, 15 pgs.

* cited by examiner

SECURE ACCESS DEVICE WITH DUAL AUTHENTICATION

CLAIM OF PRIORITY

This application is a continuation application under 35 USC § 120 of U.S. patent application Ser. No. 16/021,547, entitled "Self-Encrypting Drive," filed on Jun. 28, 2018, which is a continuation application of U.S. patent application Ser. No. 14/987,749, entitled "Data Security System with Encryption," filed on Jan. 4, 2016, which is a continuation-in-part of U.S. patent application Ser. No. 12/680,742 filed Mar. 29, 2010, which is the National Stage of International Application number PCT/US2008/077766, filed Sep. 26, 2008, which claims the benefit of U.S. Provisional Patent Application Ser. No. 60/975,814 filed Sep. 27, 2007, all of which are incorporated herein by reference in their entireties.

The present application contains subject matter related to U.S. patent application Ser. No. 14/987,678, filed on Jan. 4, 2016, entitled "Data Security System with Encryption," which is incorporated herein by reference.

TECHNICAL FIELD

The present invention relates generally to electronic devices, and more particularly to memory devices.

BACKGROUND

Security is a critical issue with almost all aspects of computer use. Storage media, such as hard disk drives attached to computers, contain valuable information, which is vulnerable to data theft. A great deal of money and effort is being applied to guarding personal, corporate, and government security information.

As portable memory storage devices have become smaller, easier to lose, more ubiquitous, cheaper, and larger in memory capacity, they have come to pose extraordinary security problems. It is now possible to download massive amounts of information surreptitiously into portable memory storage devices, such as universal serial bus flash and micro drives, cellphones, camcorders, digital cameras, iPODs, MP3/4 players, smart phones, palm and laptop computers, gaming equipment, authenticators, tokens (containing memory), etc.—in general, a mass storage device (MSD).

More specifically, there are millions of MSDs being used for backup, transfer, intermediate storage, and primary storage into which information can be easily downloaded from a computer and carried away. The primary purpose of any MSD is to store and retrieve "portable content," which is data and information tied to a particular owner not a particular computer.

The most common means of providing storage security is to authenticate the user with a computer-entered password. A password is validated against a MSD stored value. If a match occurs, the drive will open. Or, the password itself is used as the encryption key to encrypt/decrypt data stored to the MSD.

For drives that support on-the-fly encryption, the encryption key is often stored on the media in an encrypted form. Since the encryption key is stored on the media, it becomes readily available to those willing to circumvent the standard interface and read the media directly. Thus, a password is used as the key to encrypt the encryption key.

For self-authenticating drives, their authentication subsystem is responsible for maintaining security. There is no dependency on a host computer to which it is connected. Thus, a password cannot (or need not) be sent from the host in order to unlock the MSD. In fact, the encryption key no longer needs to be stored on the media. The authentication subsystem becomes the means for managing encryption keys.

Thus, a need still remains for improved security. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a data security system including: providing a mobile device with a data security system application for connectivity with the data security system; starting the data security system application; and maintaining connectivity of the data security system with the mobile device.

The present invention provides a data security system including: a data security transceiver or receiver; an authentication subsystem operatively connected to the data security transceiver or receiver; and a storage subsystem connected to the authentication subsystem.

Certain embodiments of the invention have other aspects in addition to or in place of those mentioned above. The aspects will become apparent to those skilled in the art from a reading of the following detailed description when taken with reference to the accompanying drawings.

DETAILED DESCRIPTION

Figure 1:
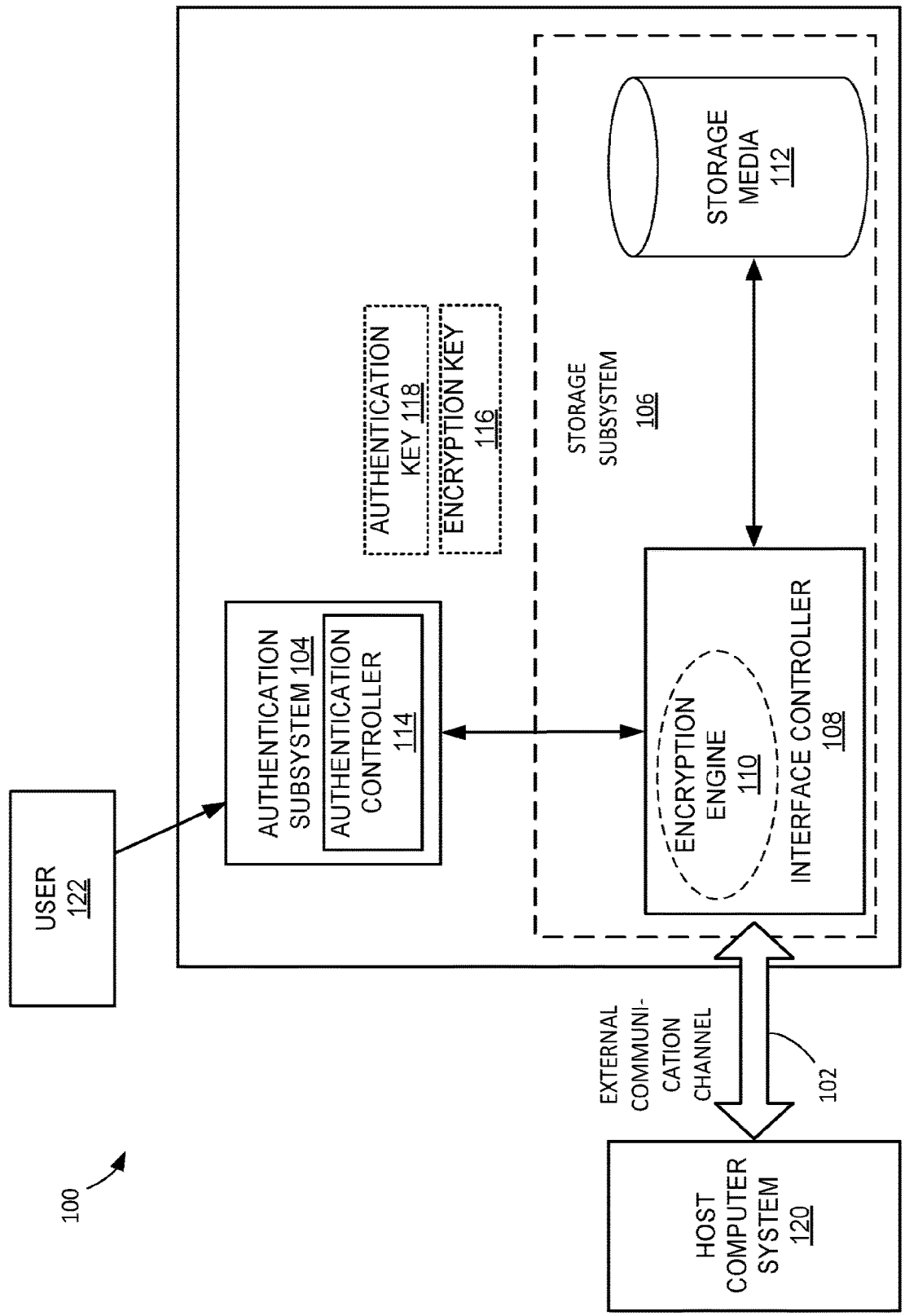
FIG. 1 is a schematic of a data security system in accordance with an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown exaggerated in the drawing FIGs. Where multiple embodiments are disclosed and described having some features in common, for clarity and ease of illustration, description, and comprehension thereof, similar and like features one to another will ordinarily be described with similar or the same reference numerals. Similarly, although the views in the drawings for ease of description generally show similar orientations, this depiction in the FIGs. is arbitrary for the most part. Generally, the invention can be operated in any orientation.

The term "system" as used herein refers to and is defined as the method and as the apparatus of the present invention in accordance with the context in which the term is used. The term "method" as used herein refers to and is defined as the operational steps of an apparatus.

For reasons of convenience and not limitation, the term "data" is defined as information that is capable of being produced by or stored in a computer. The term "data security system" is defined as meaning any portable memory device incorporating a storage medium. The term "storage media" as used herein refers to and is defined as any solid state, NAND Flash, and/or magnetic data recording system. The term "locked" refers to the data security system when the storage media is not accessible and the term "unlocked" refers to the data security system when the storage media is accessible.

There are generally two methods to make a storage device tamper resistant: 1. Apply epoxy to components—an epoxy resin applied to the printed circuit board can make it difficult to disassemble the storage device without destroying storage media. 2. Encrypt memory data—data gets encrypted as it is written to the storage media and an encryption key is required to decipher the data.

Referring now to FIG. 1, therein is shown a schematic of a data security system 100 in accordance with an embodiment of the present invention. The data security system 100 consists of an external communication channel 102, an authentication subsystem 104, and a storage subsystem 106.

The storage subsystem 106 is electronic circuitry that includes an interface controller 108, an encryption engine 110, and a storage media 112. The storage media 112 can be an internal or external hard disk drive, USB flash drive, solid state drive, hybrid drive, memory card, tape cartridge, and optical media including optical disk (e.g., Blu-ray disk, digital versatile disk or DVD, and compact disk or CD). The storage media 112 can include a data protection appliance, archival storage system, and cloud-based data storage system. The cloud storage system may be accessed utilizing a plug-in (or "plugin") application or extension software installed in a browser application, either on the host computer or on another system coupled to the host computer via a wired or wireless network, such as RF or optical, or over the world wide web.

The interface controller 108 includes electronic components such as a micro-controller with the encryption engine 110 of software or hardware, although the encryption engine 110 can be in a separate controller in the storage subsystem 106.

The authentication subsystem 104 is electronic circuitry that includes an authentication controller 114, such as a micro-controller, which may have its own non-volatile memory, such as an electrically erasable programmable read-only memory (EEPROM).

The external communication channel 102 provides a means of exchanging data with a host computer system 120. Universal Serial Bus (USB) is one of the most popular means to connect the data security system 100 to the host computer system 120. Other examples of the external communication channel 102 include Firewire, wireless USB, Serial ATA (SATA), High Definition Multimedia Interface (HDMI), Recommended Standard 232 (RS-232), and radio frequency wireless networks.

The interface controller 108 is capable of translating USB packet data to data that can be written to the storage media 112 in a USB Flash Drive.

The encryption engine 110 is implemented as part of the interface controller 108 and takes clear text and/or data (information) from the host computer system 120 and converts it to an encrypted form that is written to the MSD or the storage media 112. The encryption engine 110 also converts encrypted information from the storage media 112 and decrypts it to clear information for the host computer system 120. The encryption engine 110 can also be a two-controller subsystem with an encryption controller that has the encryption capability to encrypt/decrypt data on the fly along with managing the communication protocol, memory, and other operating conditions and a communication/security controller for handling the communication, encryption key management, and communications with the encryption controller.

An encryption key 116 is required by the encryption engine 110 to encrypt/decrypt the information. The encryption key 116 is used in an algorithm (e.g., a 256-bit Advanced Encryption Standard (AES) encryption) that respectively encrypts/decrypts the data by an encryption algorithm to render data unreadable or readable. The encryption key 116 can be stored either internally or externally to the authentication controller 114.

The encryption key 116 is transmitted to the encryption engine 110 by the authentication subsystem 104 once a user 122, having an identification number or key, has been verified against an authentication key 118.

It has been discovered that, by the employment of the authentication key 118 and the encryption key 116, portable memory storage devices of the various embodiments of the present invention can be provide an extremely high level of security previously not available in such devices.

When the data security system 100 is locked, the authentication key 118 remains inside the authentication subsystem 104 and cannot be read from outside. One method of hiding the authentication key 118 is to store it in the authentication controller 114 in the authentication subsystem 104. Setting the security fuse of the authentication controller 114 makes it impossible to access the authentication key 118 unless the authentication controller 114 allows retrieval once the user 122 has been verified. Many micro-controllers come equipped with a security fuse that prevents accessing any internal memory when blown. This is a well-known and widely used security feature. Such a micro-controller could be used for the authentication controller 114. The authentication controller 114 can be a micro-controller or microprocessor.

The authentication key 118 can be used as in several capacities: 1. As the encryption key 116 to encrypt/decrypt the information directly. 2. As a key to recover the encryption key 116 stored in the data security system 100 that can be accessed by the interface controller 108. 3. Used for direct comparison by the interface controller 108 to activate the external communication channel 102.

Figure 2:
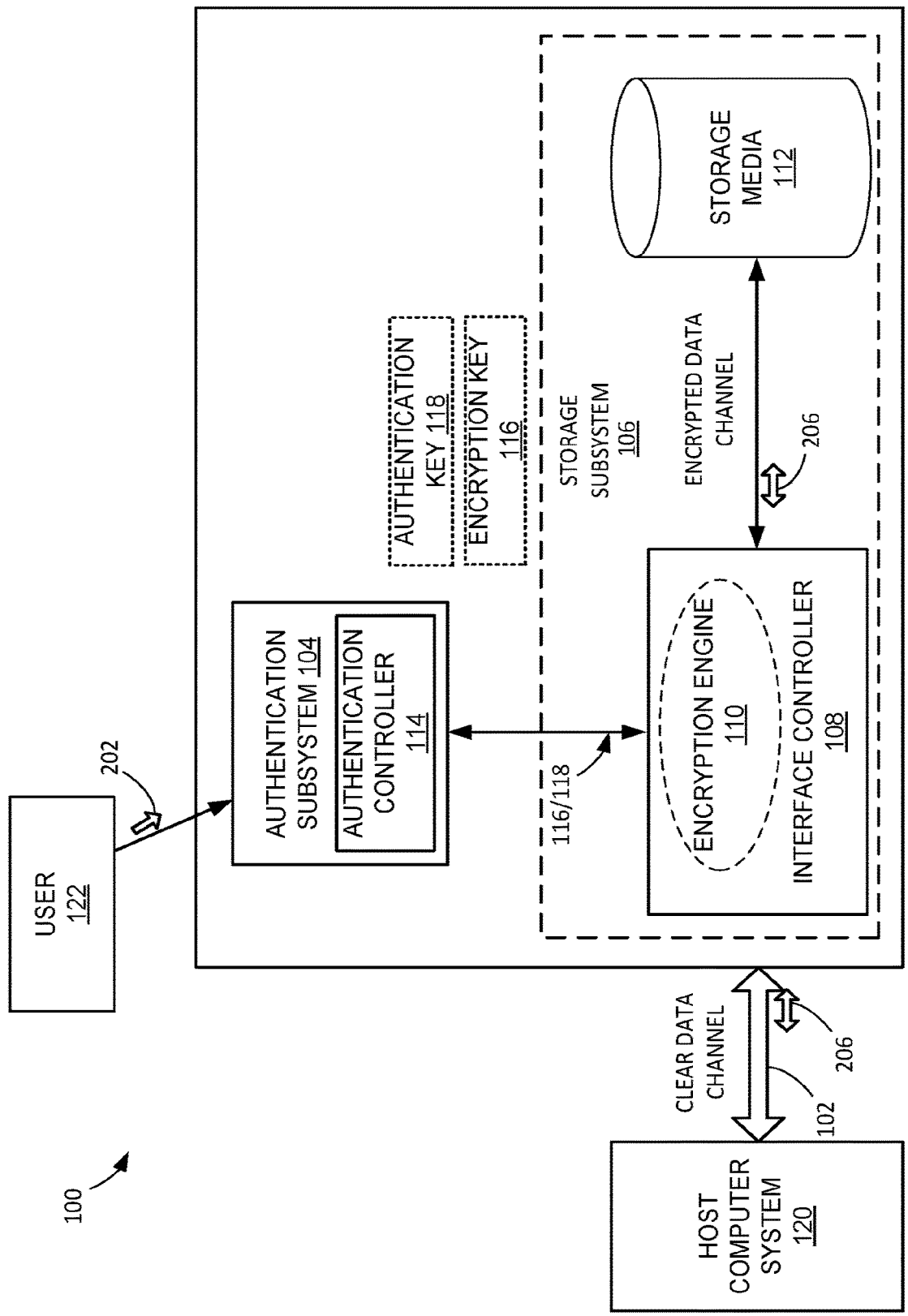
FIG. 2 is an illustration of an authentication key delivery method used with the data security system.

Referring now to FIG. 2, therein is shown an illustration of an authentication key delivery method used with the data security system 100. In this illustration, the authentication key 118 and the encryption key 116 are one and the same. The encryption engine 110 employs the authentication key 118 as the encryption key 116.

The user 122 must interact with the authentication subsystem 104 by providing user identification 202, a number or key, to the authentication subsystem 104. The authentication subsystem 104 validates the user 122 against the authentication key 118. The authentication subsystem 104 then transmits the authentication key 118 as the encryption key 116 to the interface controller 108.

The encryption engine 110 in the interface controller 108 employs the authentication key 118 to convert clear information to encrypted information and encrypted information to clear information along a channel 206. Any attempt to read encrypted information from the storage media 112 without the encryption key 116 will generally result in information that is unusable by any computer.

Figure 3:
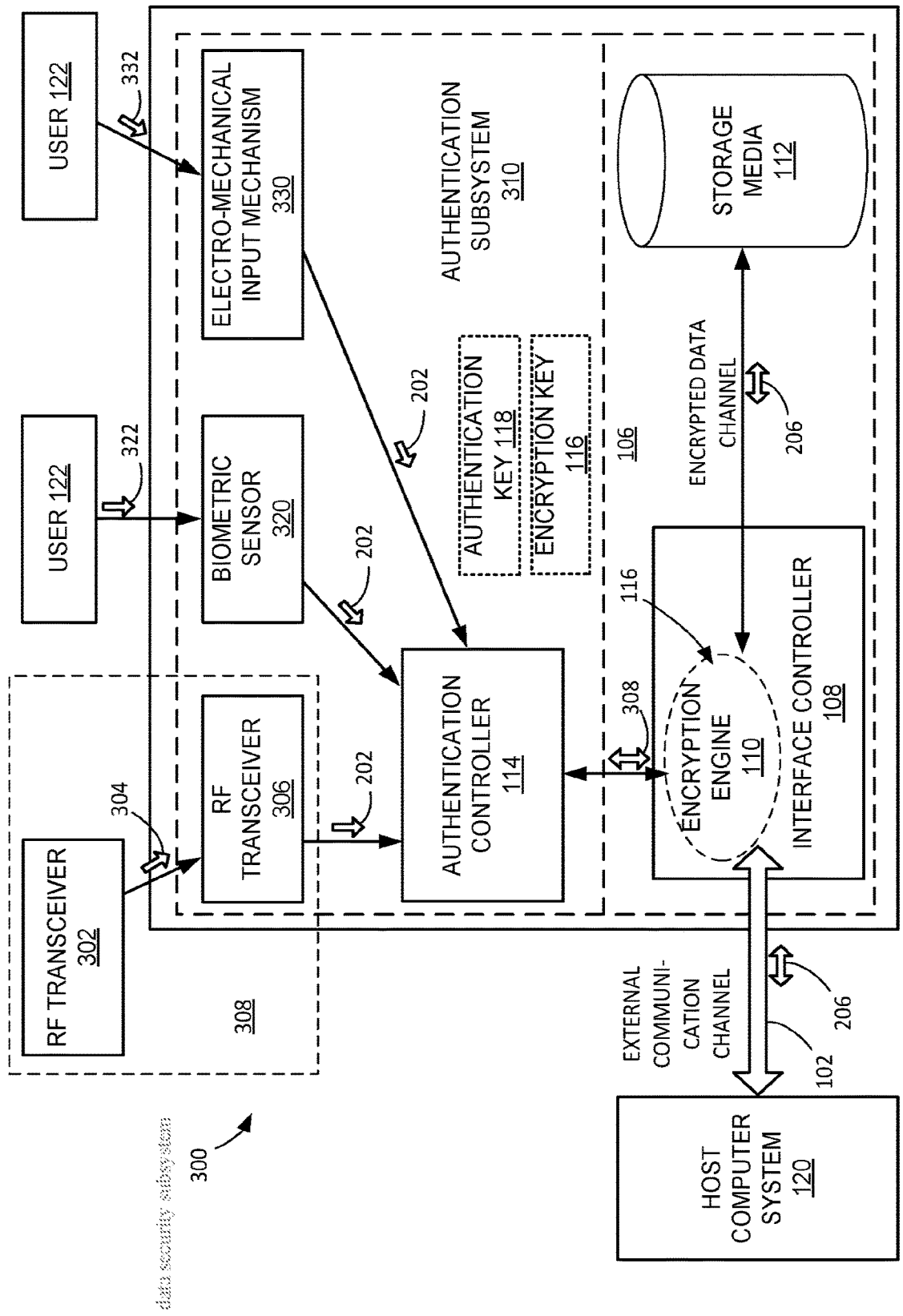
FIG. 3 is an illustration of different systems for the user to interact with the data security system.

Referring now to FIG. 3, therein is shown an illustration of different systems for the user 122 to interact with a data security system 300. The interaction can be by a communication combination 301, which can be by a physical contact, wired connection, or wireless connection from a cell phone, smartphone, smart watch, wearable appliance, or other wireless device.

In one authentication system, a mobile transceiver 302 is employed to transmit user identification 304 to a data security transceiver 306 in an authentication subsystem 310. For exemplary purposes, transceivers are employed for bi-directional communication flexibility but a transmitter-receiver combination for uni-directional communication could also be used. The authentication subsystem 310 includes the authentication controller 114, which is connected to the interface controller 108 in the storage subsystem 106. The user identification 304 is supplied to the data security transceiver 306 within the authentication subsystem 310 by the mobile transceiver 302 from outside the storage subsystem 106 of the data security system 300. The wireless communication may include Wireless Fidelity (WiFi), Bluetooth (BT), Bluetooth Smart, Near Field Communication (NFC), Global Positioning System (GPS), optical, cellular communication (for example, Long-Term Evolution (LTE), Long-Term Evolution Advanced (LTE-A)), Code Division Multiple Access (CDMA), Wideband Code Division Multiple Access (WCDMA), Universal Mobile Telecommunications System (UMTS), Wireless Broadband (WiBro), or Global System for Mobile Communications (GSM), and the like).

The authentication subsystem 310 validates the user 122 against the authentication key 118 by a code sent from the mobile transceiver 302 being validated against the authentication key 118. The authentication subsystem 310 then transmits the encryption key 116 to the interface controller 108 across the communication combination 301.

The encryption engine 110 then employs the encryption key 116 to convert clear information to encrypted information and encrypted information to clear information along the channel 206. Any attempt to read encrypted information from the storage media 112 without the encryption key 116 will result in information that is unusable by the host computer system 120.

In an optional second authentication mechanism, the authentication subsystem 310 validates the user 122 against the authentication key 118 by having the user 122 employ a biometric sensor 320 to supply a biometric input 322 to verify his/her identity as an authorized user. Types of biometric identification include a fingerprint, an iris scan, a voice imprint, etc.

In an optional third authentication mechanism, the authentication subsystem 310 validates the user 122 against the authentication key 118 by having the user 122 employ an electro-mechanical input mechanism 330 to supply a unique code 332 to verify his/her identity as an authorized user. The unique code 332 can include a numerical, alphanumeric, or alphabetic code, such as a PIN. The electro-mechanical input mechanism 330 is within the authentication subsystem 310. The electro-mechanical input mechanism 330 receives the unique code 332 from the user 122 from outside of the data security system 300. The unique code 332 is supplied to the electro-mechanical input mechanism 330 within the authentication subsystem 310 from outside the storage subsystem 106 of the data security system 300.

No matter which method is used to validate the user 122, the authentication key 118 and the encryption key 116 remain hidden until the user 122 is authenticated.

Figure 4:
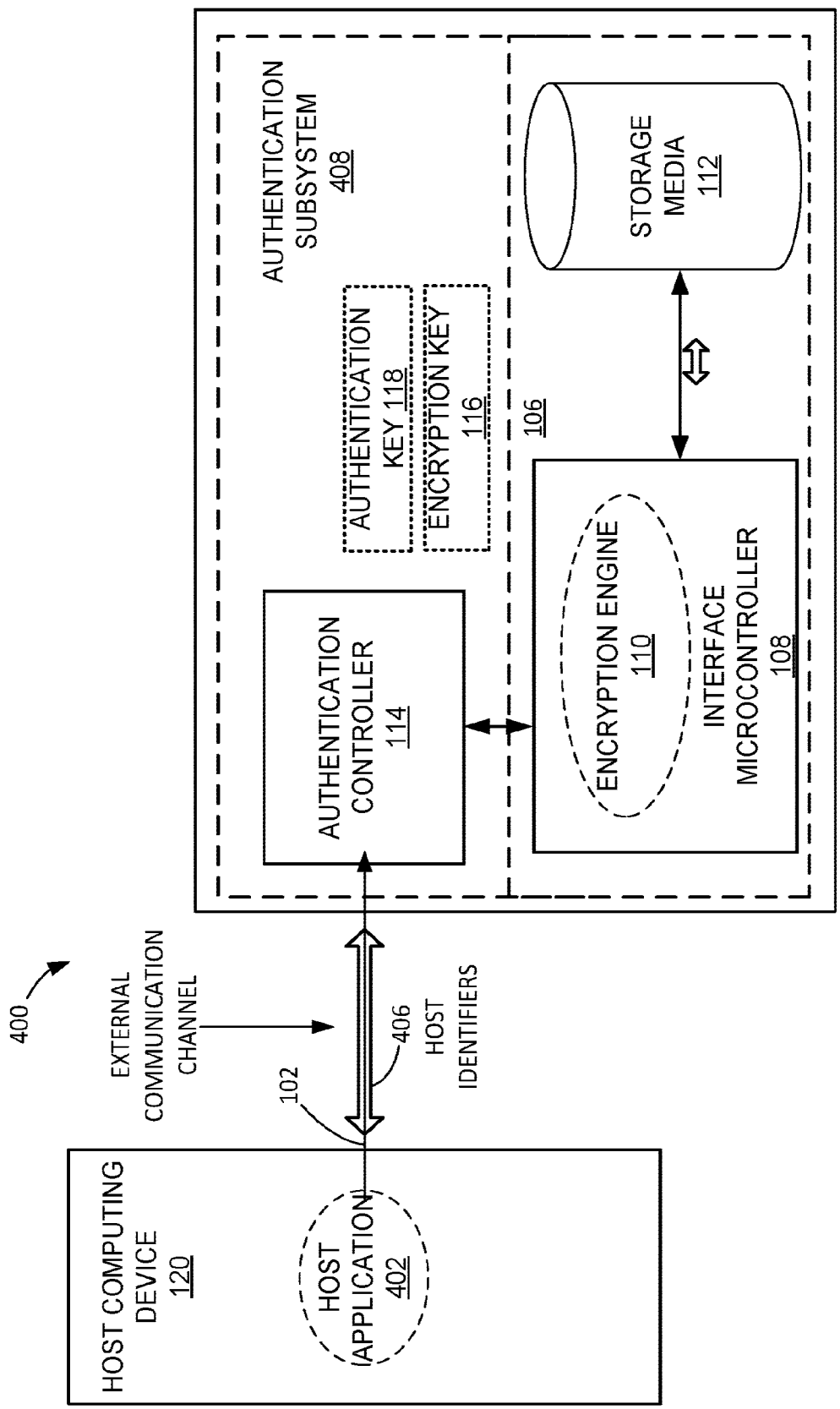
FIG. 4 is an illustration of how the user can employ the host computer system to interact with a data security system.

Referring now to FIG. 4, therein shows an illustration of how the user 122 can employ the host computer system 120 to interact with a data security system 400.

The host computer system 120 is provided with a host application 402. The host application 402 is software or firmware, which communicates over the external communication channel 102 of the data security system 400.

The host application 402 delivers host identifiers 406, such as internal component serial numbers (e.g. hard drive), media access control (MAC) address of a network card, login name of the user, network Internet Protocol (IP) address, an ID created by the data security system and saved to the host, an ID created by the data security system and saved to the network, etc., associated with its environment. The host identifiers 406 are employed by an authentication subsystem 408 in the data security system 400.

When the authentication subsystem 408 validates the user 122 against the authentication key 118 by verifying the host identifiers 406, the data security system 400 will unlock.

For example, the user 122 connects the data security system 400 that is locked to the host computer system 120. The host application 402 sends the MAC address of its network card to the data security system 400. The data security system 400 recognizes this MAC address as legitimate and unlocks without the user 122 of FIG. 1 having to enter user identification. This is implementation does not require any interaction with the user 122. In this case, it is the host computer system 120 and its associated environment that are being validated.

The data security system 400 includes: providing the authentication key 118 stored in the authentication subsystem 104; providing verification of the host computer system 120 by the authentication subsystem 104; presenting the encryption key 116 to the storage subsystem 106 by the authentication subsystem 104; and providing access to the storage media 112 by the storage subsystem 106 by way of decrypting the storage media content.

The data security system further includes the authentication subsystem 104 for interpretation of biometric input and verification of the user 122.

The data security system further includes using the authentication key 118 as the encryption key 116 directly.

The data security system further includes using the authentication key 118 to decrypt and retrieve the encryption key 116 used to decipher internal content.

The data security system further includes the authentication subsystem 104 for interpretation of signal inputs and verification of sending unit.

The data security system further includes the authentication subsystem 104 for interpretation of manually entered input and verification of the user 122.

The data security system further includes the authentication subsystem 104 for interpretation of input sent by a host resident software application for verification of the host computer system 120.

The data security system as further includes the encryption engine 110 outside the interface controller 108 but connected to the external communication channel 102 for the purpose of converting clear data to encrypted data for unlocking the data security system 100.

Figure 5:
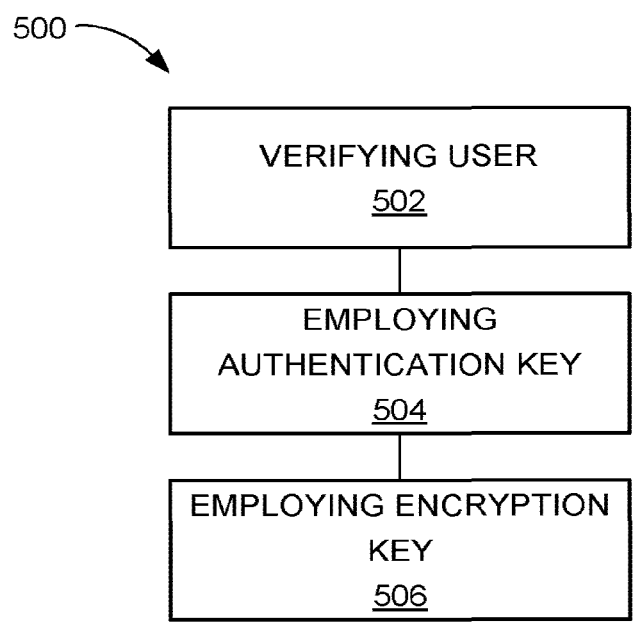
FIG. 5 is a data security method employing user verification for the data security system.

Referring now to FIG. 5, therein is shown a data security method 500 employing user verification for the data security system 100. The data security method 500 includes; verifying the user against an authentication key in a block 502; employing the authentication key for retrieving an encryption key in a block 504; and employing the encryption key for allowing unencrypted communication through a storage subsystem between a host computer system and a storage media in a block 506.

Figure 6:
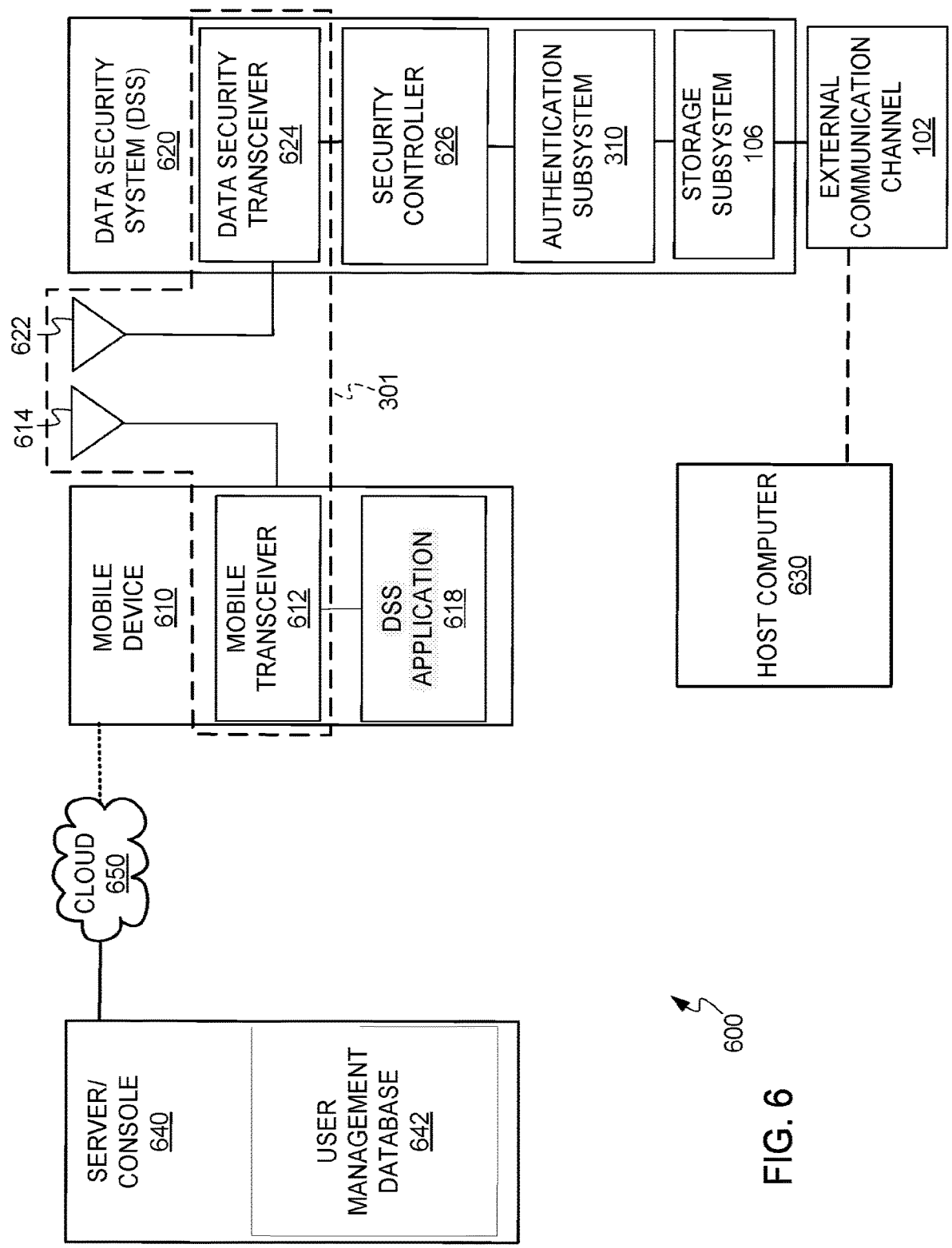
FIG. 6 is an exemplary data security communication system.

Referring now to FIG. 6, therein is shown an exemplary data security communication system 600. The exemplary data security communication system 600 includes a mobile device 610, a data security system 620, a host computer 630, and a server/console 640. The mobile device 610 and the server/console 640 are connected by wired or wireless connections through a cloud 650, which can be an Internet cloud. The mobile device 610 and the data security system 620 are connected by the communication combination 301.

The communication combination 301 in the exemplary data security communication system 600 includes a mobile transceiver 612 in the mobile device 610 with an antenna 614 wirelessly communicating with an antenna 622 of a data security transceiver 624 in the data security system 620.

The mobile device 610 in one embodiment can be a smartphone. In the mobile device 610, the mobile transceiver 612 can be connected to conventional mobile device components and to a data security system application 618, which provides information to be used with the data security system 620.

The data security transceiver 624 is connected to a security controller 626, which can contain identification, passwords, profiles, or information including that of different mobile devices that can access the data security system 620. The security controller 626 is connected to subsystems similar to the authentication subsystem 310, the storage subsystem 106 (which in some embodiments can have encryption to encrypt data), and the external communication channel 102.

The external communication channel 102 is connectable to the host computer 630 to allow, under specified circumstances, access to data in the storage subsystem 106.

One implementation of the data security system 620 can eliminate the biometric sensor 320 and the electro-mechanical input mechanism 330 of FIG. 3 with only a wireless link to the mobile device 610, such as a smartphone. It has been found that this implementation makes the data security system 620 more secure and useful.

The data security system application 618 allows the mobile device 610 to discover all data security systems in the vicinity of the mobile device 610 and show their status (locked/unlocked/blank, paired/unpaired etc.).

The data security system application 618 allows the mobile device 610 to connect/pair, lock, unlock, change the name and password, and reset all data on the data security system 620.

The data security system application 618 allows the mobile device 610 to set an inactivity auto-lock so the data security system 620 will automatically lock after a predetermined period of inactivity or to set a proximity auto-lock so the data security system 620 will be locked when the mobile device 610 is not within a predetermined proximity for a predetermined time period (to improve reliability and avoid signal de-bouncing).

The data security system application 618 allows the mobile device 610 to remember a password, use TouchID, and Apple Watch (both TouchID and Apple Watch mentioned here as examples only, there are many other mobile devices with biometric sensors and wearables that can be used in a similar mode) so data security system 620 could be unlocked without entering re-entering a password on the mobile device The data security system application 618 allows the mobile device 610 to be set to operate only with a specific mobile device, such as the mobile device 610, so the data security system 620 cannot be unlocked with other mobile devices (1Phone).

The data security system application 618 allows the mobile device 610 to set the data security system 620 to Read-Only The data security system application 618 allows the mobile device 610 to be operated in User Mode or Administrator Mode (administrator's mode overrides user's settings) and use the server/console 640. The server/console 640 is a combination of a computer with a console for entering information into the computer.

The server/console 640 contains a user management database 642, which contains additional information that can be transmitted over the cloud 650 to the mobile device 610 to provide additional functionality to the mobile device 610.

The user management database 642 allows the server/console 640 to create and identify users using UserID (username and password) and block/allow unlocking the data security system 620 and provide remote help.

The user management database 642 allows the server/console 640 to remotely reset or unlock the data security system 620.

The user management database 642 allows the server/console 640 to remotely change the data security system user's PIN.

The user management database 642 allows the server/console 640 to restrict/allow unlocking data security system 620 from specific locations (by using geo-fencing)

The user management database 642 allows the server/console 640 to restrict/allow unlocking data security system 620 in specified time periods and different time zones The user management database 642 allows the server/console 640 to restrict unlocking data security system 620 outside of specified team/organization/network etc.

Figure 7:
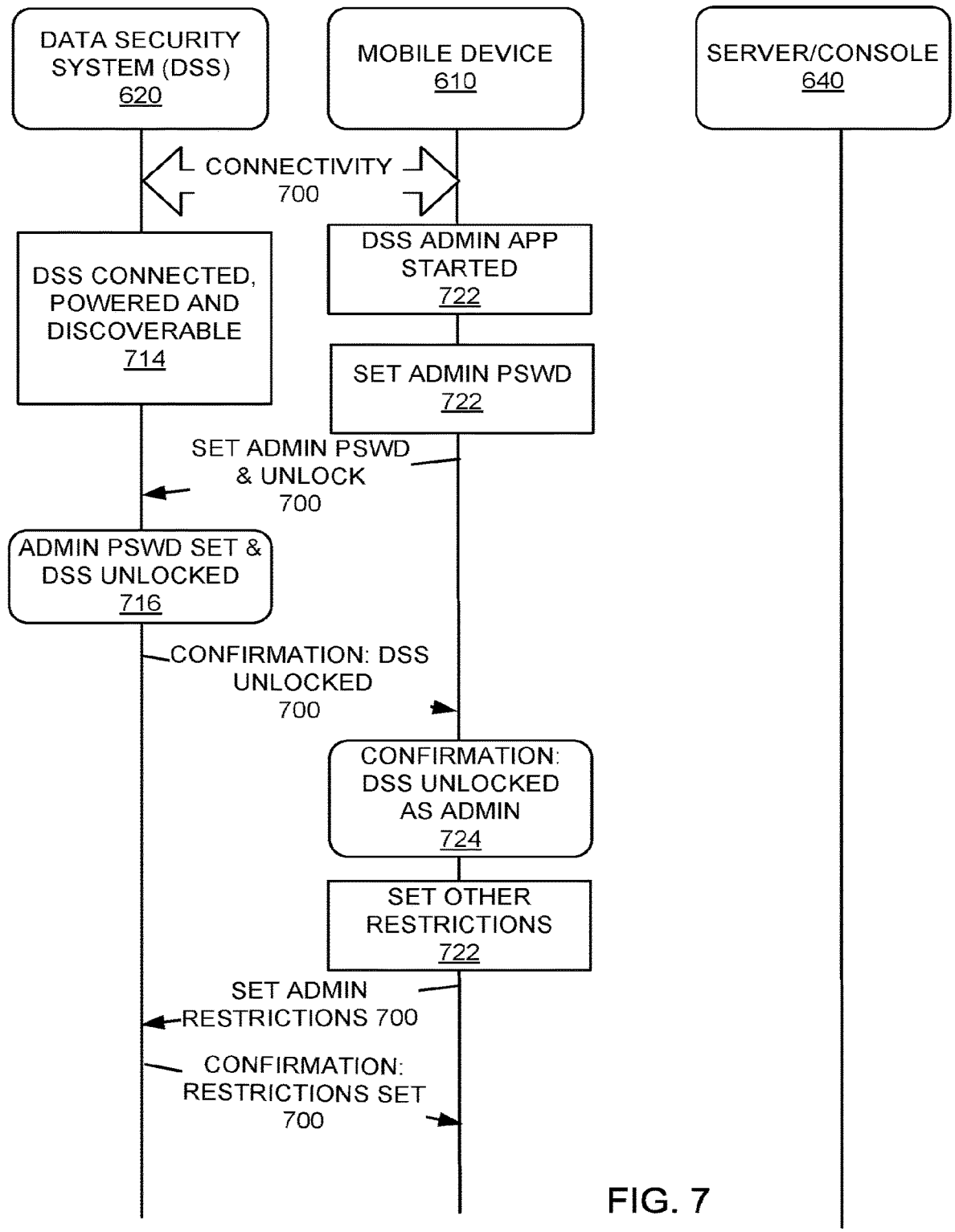
FIG. 7 is an administrator sequencing diagram showing the sequence of operations between a mobile device and the data security system.

Referring now to FIG. 7, therein is shown an administrator sequencing diagram showing the sequence of operations between the mobile device 610 and the data security system 620.

Connectivity 700, between the data security system 620 and the mobile device 610, is first established with mutual discovery of the other device or system, pairing the device and system, and connection of the device and system. The connectivity 700 is secured using a shared secret, which is then used to secure (encrypt) communications between the data security system 620 and the mobile device 610 for all future communication sessions. A standard encryption algorithm is selected to be both efficient to run on the data security system 620 and to be approved by world-wide security standards.

The connectivity 700 is maintained by the data security system application 618 or the security controller 628 or both operating together as long as the data security system 620 and the mobile device 610 are within a predetermined distance of each other. Further, if the predetermined distance is exceeded, the connectivity 700 is maintained for a predetermined period of time after which the data security system 620 is locked.

After connection of the mobile device 610 and the data security system 620, a data security system administrator application start operation 702 occurs in the mobile device 610. Then an administrator sets a password in an administrator password operation 704. Also after connection of the mobile device 610 and the data security system 620, the data security system 620 is connected to the host computer 630 of FIG. 6 to be powered up and discoverable by the host computer 630 in a data security system connected, powered and discoverable operation 706.

After the administrator password operation 704, the mobile device 610 sends a set administrator password and unlock signal 708 to the data security system 620. The set administrator password and unlock signal 708 causes an administrator password set and data security system unlocked operation 716 to occur in the data security system 620.

When the administrator password set and data security system unlocked operation 716 is completed, a confirmation: data security system unlocked signal 712 is sent to the mobile device 610 where a confirmation: data security system unlocked as administrator operation 714 operates. The confirmation: data security system unlocked as administrator operation 714 permits a set other restrictions operation 716 to be performed using the mobile device 610. The set other restrictions operation 716 causes a set administrator restrictions signal 718 to be sent to the data security system 620 where the administrator restrictions are set and a confirmation: restrictions set signal 720 is returned to the mobile device 610. Thereafter, the mobile device 610 and the data security system 620 are in full operative communication.

Because it is possible to communicate with the data security system 620 without having physical contact with the data security system 620, it is required that significant interactions with the data security system 620 be accompanied by a data security system unique identifier that is either printed on the data security system 620 itself, or that comes with the data security system 620 packaging and is readily available to the data security system 620 owner.

On making requests that could affect user data, such as unlocking or resetting the data security system 620, this unique identifier (unique ID) is required. Attempts to perform these operations without the correct identifier are ignored and made harmless. The unique identifier is used to identify the data security system 620 to the mobile device 610 in a way that requires the user to have physical control over the data security system 620 and to verify the connectivity 700 is established between the authorized, previously paired device and system, such as the mobile device 610 and the data security system 620. Once the devices are paired, the shared secret is used to make the communication confidential.

Pairing connotes that a mobile device and a data security system have a unique and defined relationship established at some time in the past and enduring.

The unique identifier makes for giving the user some control over the data security system when the user has physical control of the data security system.

To increase the security of the communication with the data security system 620 where the mobile device 610 is a smartphone, a user may choose to enable a feature, such as a feature called 1Phone here. This feature restricts significant user interactions with the data security system 620 to one and only one mobile device 610. This is done by replacing the data security system unique identifier described above with a random identifier shared securely between the data security system 620 and the mobile device 610. So, instead of presenting the data security system unique identifier when, for example, the user unlocks the data security system 620, the 1Phone identifier must be given instead. In effect, this makes the user's mobile device 610 a second authentication factor for using the data security system 620 in addition to a PIN or password. As an example, the paired user phone selected as "1Phone" can be used without a PIN, and as the user-authentication single factor and/or in a combination with any other user-authentication factors. If such feature (1Phone) is selected, the data security system 620 cannot be open with any other phones, except if an administrator's unlock was enabled before.

It will be understood that other embodiments can be made to require an administrator's password on the data security system 620 in order to use the 1Phone feature. Another embodiment may require that the server/console 640 is capable of recovering the data security system 620 in case the 1Phone data is lost on the mobile device 610.

The user may enable a proximity auto-lock feature for the data security system 620. During a communication session, the data security transceiver 624 of FIG. 6 reports to the data security system 620 a signal strength measurement for the mobile device 610. The data security system application 618 on the mobile device 610 sends the data security system 620 both the originating signal power level and the threshold for proximity.

Because the signal strength varies due to environmental conditions around the transceivers, the data security system 620 mathematically smoothes the signal strength measurements to reduce the likelihood of a false positive. When the data security system 620 detects that the signal power received has dropped below a defined threshold for a predetermined period of time, it will immediately lock the data security system 620 and prevent access to the storage subsystem 106 of FIG. 6.

The data security system 620 could be used in three different modes: a User Mode where the functionalities of the data security system 620 are determined by the user; an Administrator Mode where an administrator can set an Administrator password and enforce some restrictions on the data security system 620 (e.g., automatic lock after a predetermined period of inactivity, Read-Only, 1Phone) and where restrictions cannot be removed by a User; and a Server Mode where an administrator role is set where the server/console 640 can remotely reset the data security system 620, change user passwords, or just unlock the data security system 620.

Figure 8:
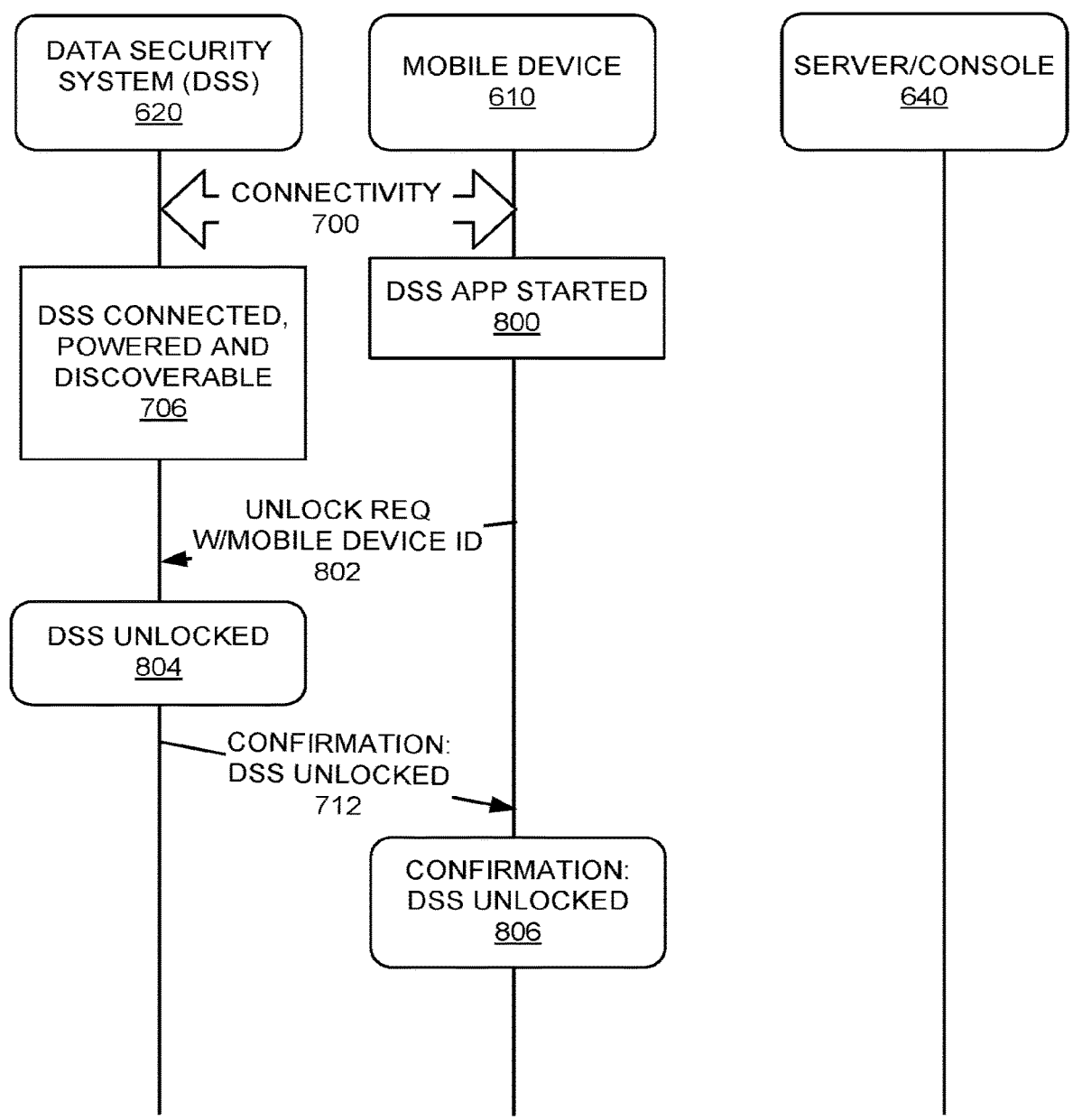
FIG. 8 is a unlocking sequence diagram where the mobile device is an authentication factor.

Referring now to FIG. 8, therein is shown a unlocking sequence diagram where the mobile device 610 is an authentication factor. This diagram shows auto-unlock process of the data security system 620 initiated by the data security system application 618 from specific mobile device, the mobile device 610. A user can use only one mobile device that was initially paired with the data security system 620. If the paired mobile device 610 is lost then the data security system 620 could not be unlocked (unless administrator password was set before as shown in FIG. 7).

While similar to FIG. 7, a data security system application started operation 800 occurs after the connectivity 700 is established. An unlock required with mobile device ID signal 802 is sent from the mobile device 610 to the data security system 620 after a data security system connected, powered and discoverable operation 706. A data security system unlocked operation 804 occurs and a confirmation: data security system unlocked signal 712 is sent from the data security system 620. After a confirmation: data security system unlocked operation 806, the mobile device 610 and the data security system 620 are in full operative communication.

If a PIN (Personal Identification Number) was not setup then the paired mobile device is used as 1-authentication factor.

Figure 9:
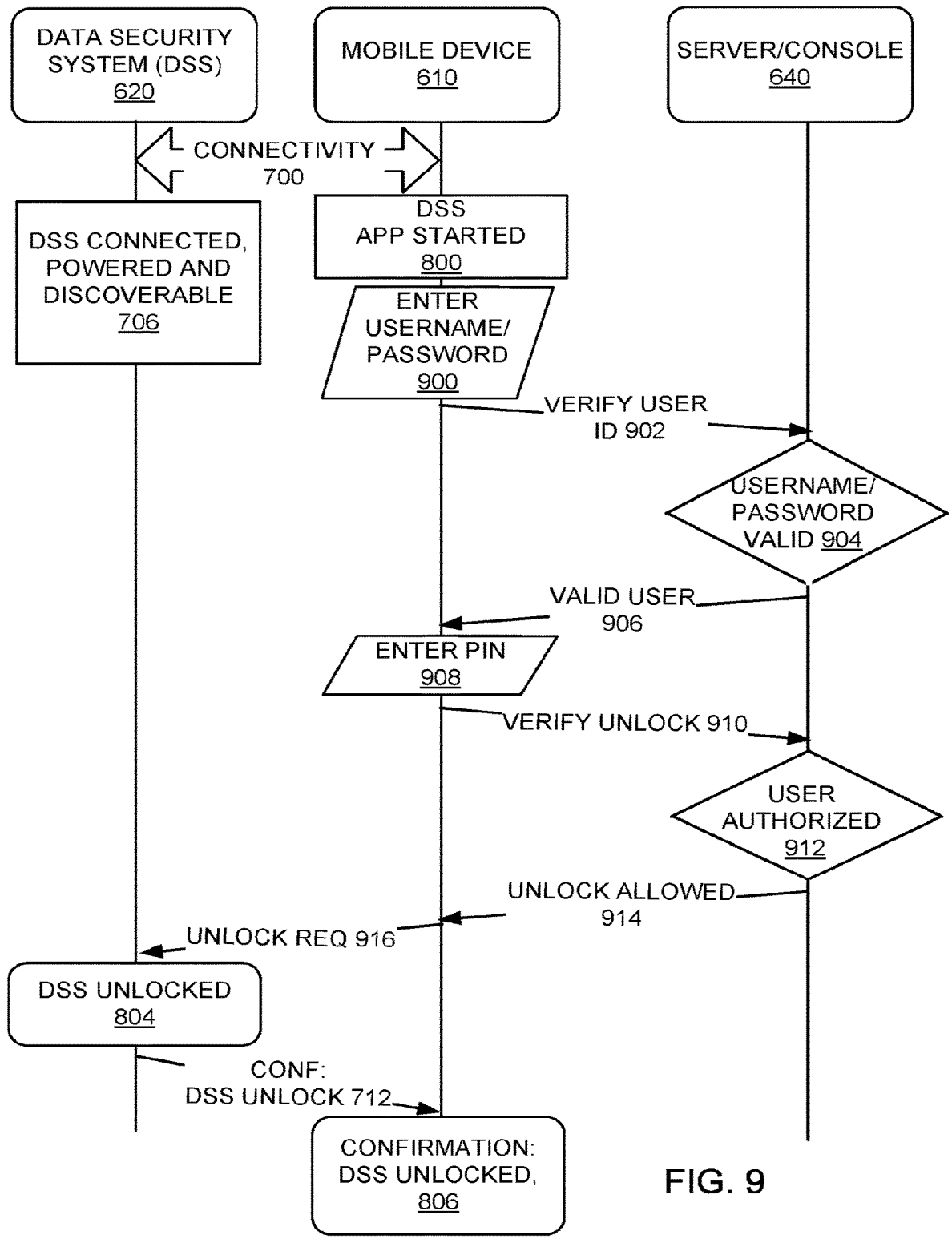
FIG. 9 is an unlock sequencing diagram showing unlocking using a PIN entry from the mobile device.

Referring now to FIG. 9, therein is shown an unlock sequencing diagram showing unlocking using a PIN entry from the mobile device 610. This diagram shows process of unlocking the data security system 620 by entering a PIN in the data security system application 618 in the mobile device 610. The data security system 620 cannot be unlocked without entering the correct PIN.

While similar to FIGS. 7 and 8, an enter username/password operation 900 occurs after the data security system application started operation 800. After the enter username/password operation 900, the mobile device 610 sends a verify user ID signal 902 to the server/console 640. The server/console 640 then makes a username/password valid determination 904.

When the username/password valid determination 904 verifies the user, a valid user signal 906 is sent to the mobile device 610 for the user to enter the correct PIN in an enter PIN operation 908 in the mobile device 610. The mobile device 610 then sends a verify unlock signal 910 to determine if the correct PIN has been entered to the server/console 640.

The server/console 640 makes a user authorized determination 912 and determines if the user is authorized to use the specific data security system, such as the data security system 620, that the PIN is authorized for. If authorized, an unlock allowed signal 914 is sent to the mobile device 610, which passes on an unlock request signal 916 to the data security system 620.

The data security system unlocked operation 804 is performed and the confirmation: data security system unlocked signal 712 is sent to the mobile device 610 where the confirmation: data security system unlocked operation 806 is performed.

Figure 10:
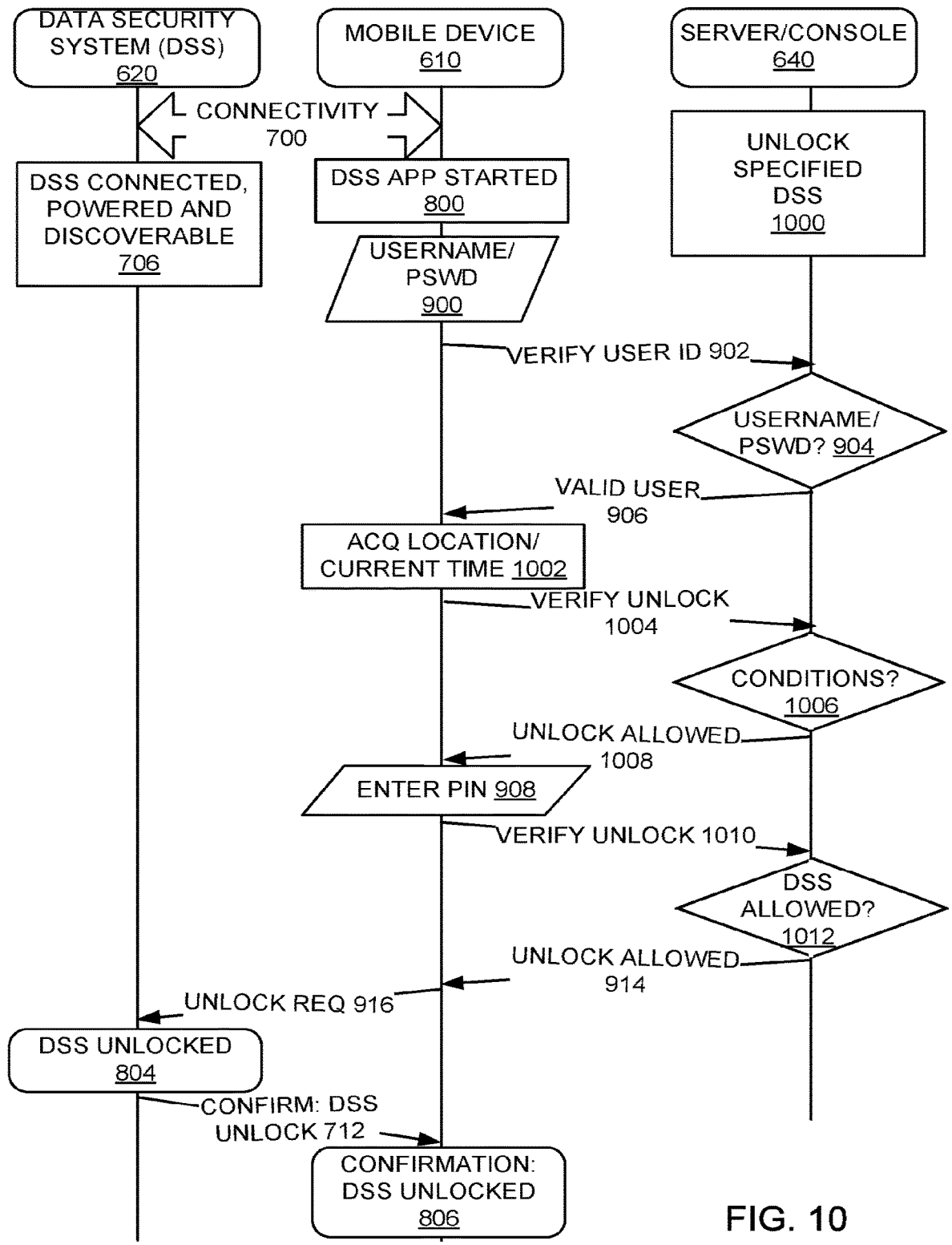
FIG. 10 is an unlock sequencing diagram showing unlock using a PIN entry and User ID/location/time verification via the server/console.

Referring now to FIG. 10, therein is shown an unlock sequencing diagram showing unlock using a PIN entry and User ID/location/time verification via the server/console 640. This diagram shows the most secure process of unlocking the data security system 620 by entering a PIN in the data security system application 618 from the mobile device 610, authentication in the server/console 640 server using a UserID (username/password) and by verifying geo-fencing permissions to unlock the data security system 620 at a specific location and at a certain time range. The data security system 620 could not be unlocked without entering the PIN, username and password, and having the mobile device 610 be present in specific (predefined) location and certain (predefined) time.

While similar to FIGS. 7-9, at the server/console 640, an unlock specified data security system operation 1000 is performed to allow setting of the desired conditions under which the specified data security system, such as the data security system 620, will operate. For example, the conditions could be within a specific geographical area and/or specific time frame.

At the mobile device 610, a current condition determination is made, such as in an acquire location and/or current time operation 1002. This operation is performed to determine where the mobile device 610 is located and or what the current time is where the mobile device 610 is located. Other current conditions around the mobile device 610 may also be determined and sent by a verify unlock signal 1004 to the server/console 640 where a conditions-met determination 1006 is made.

When the desired conditions are met, an unlock allowed signal 1008 is sent to the mobile device 610 for the enter PIN operation 908 to be performed. After the PIN is entered, a verify unlock signal 1010 is sent with the PIN and an identification of the data security system 620 that is in operational proximity to the mobile device 610. The verify unlock signal 1010 is received by the server/console 640 and a data security system allowed determination 1012 is made to determine that the specified data security system is allowed to unlock by the authorized user. The server/console 640 verifies that this "specific" user is authorized to use the specified data security system.

After determining the correct information has been provided, the server/console 640 will provide an unlock allowed signal 914 to the mobile device 610, which will provide a unlock request signal 916. The unlock request signal 916 causes the data security system 620 to operate.

Figure 11:
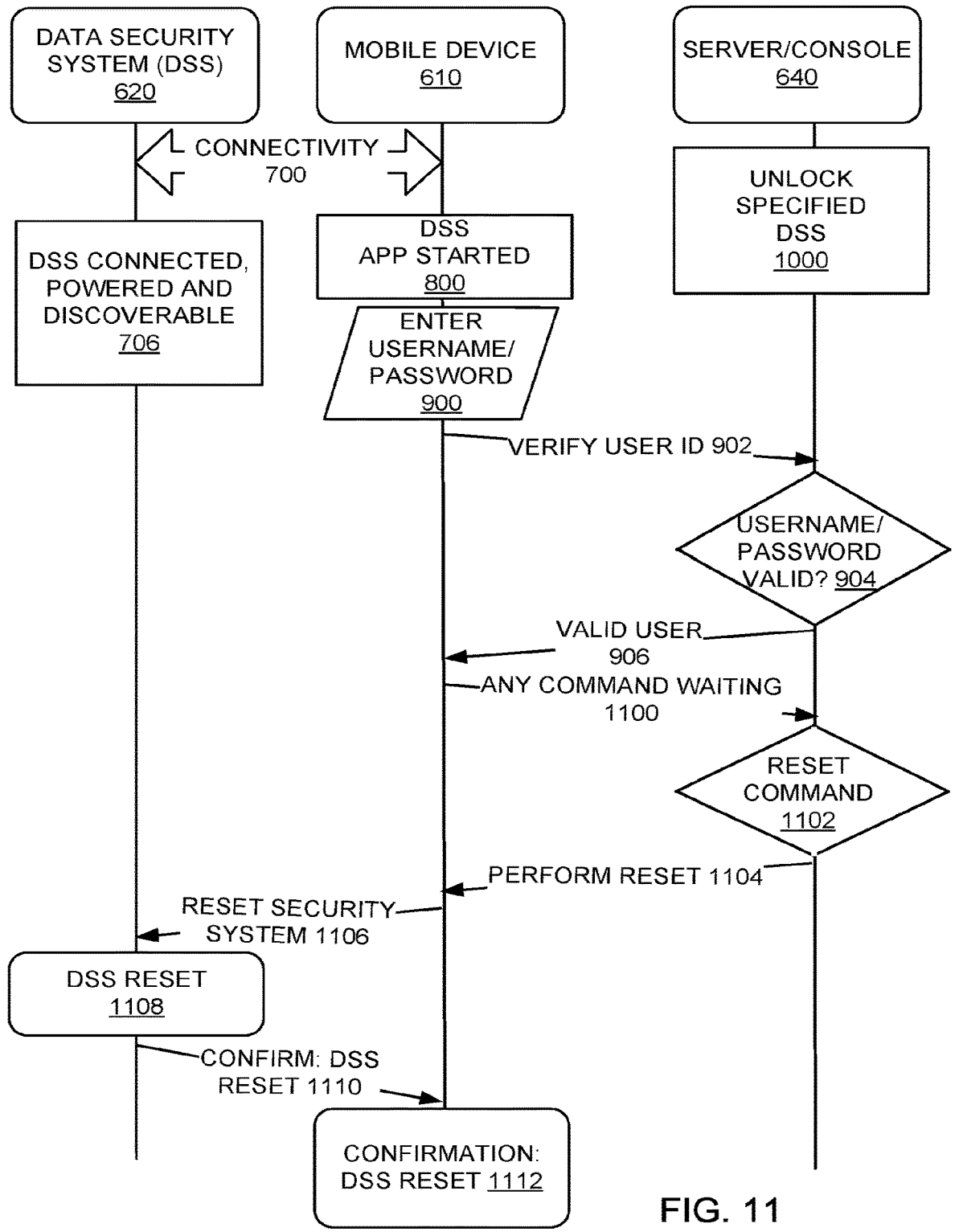
FIG. 11 is a reset sequencing diagram showing resetting the data security system using a server/console.

Referring now to FIG. 11, therein is shown a reset sequencing diagram showing resetting the data security system 620 using the server/console 640. This diagram shows the ability to reset the data security system 620 remotely via the server/console 640. The data security system 620 can receive commands only from the mobile device 610 over the wireless connection. However, by setting a "Reset" flag on the server/console 640 for a specific data security system (using its S/N), the data security system application 618 running on the mobile device 610 will query the server/console 640 for any flags/pending requests in the user management database 642. When the user connects the data security system 620, the data security system application 618 on the mobile device 610 will execute a waiting "reset" command. After a successful reset (all user data and credentials are gone), the server/console 640 will remove the Reset flag so it will not be executed the next time when the mobile device 610 is connected to the specific data security system.

While similar to FIGS. 7-10, the mobile device 610 responds to the valid user signal 906 to send an any command waiting signal 1100 to the server/console 640 to make a reset command determination 1102. When the reset command is present, a perform reset signal 1104 will be sent to the mobile device 610.

The mobile device 610 will send a reset security system signal 1106 to the data security system 620 to start a data security system reset operation 1108. Upon completion of the data security system reset operation 1108, the data security system 620 will send a confirmation: data security system reset signal 1110 to the mobile device 610 to set a confirmation: data security system reset operation 1112 into operation. Thereafter, the mobile device 610 and the data security system 620 are in full operative communication with the data security system 620 reset.

Figure 12:
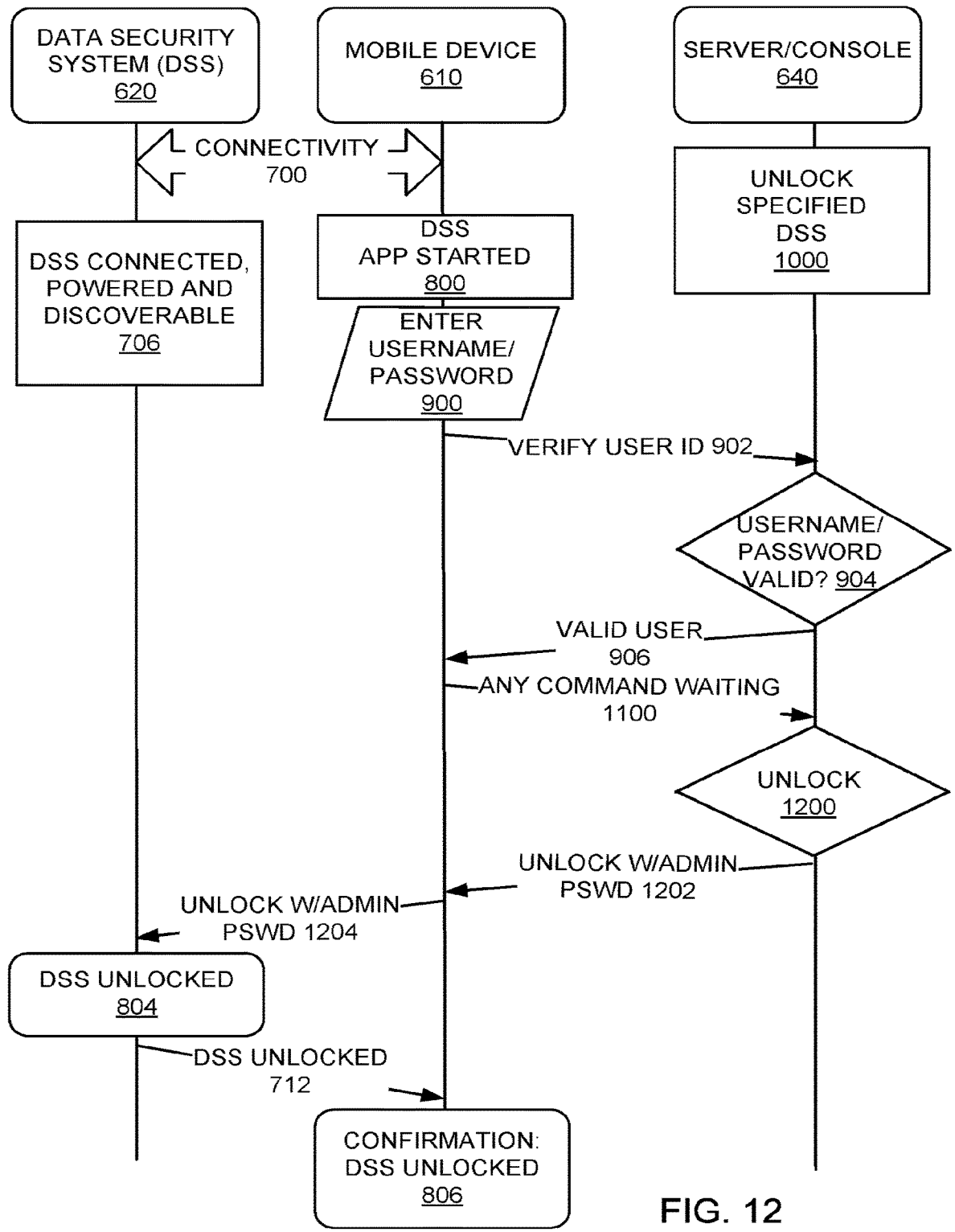
FIG. 12 is an unlock sequencing diagram showing unlocking the data security system using the server/console.

Referring now to FIG. 12, therein is shown an unlock sequencing diagram showing unlocking the data security system 620 using the server/console 640. This diagram shows ability to unlock the data security system 620 remotely via the server/console 640. The data security system 620 can receive commands only from the mobile device 610 over the wireless connection. However, by setting an "Administrator Unlock" flag on the server/console 640 console for a specific data security system (using it's S/N), the data security system application 618 running on the mobile device 610 will query the server/console 640 for any flags/pending requests. When the user connects the data security system 620, the data security system application 618 on the mobile device 610 will execute a waiting "Administrator Unlock" command. After successful Administrator unlock, the user's data is untouched, but the user's password is removed (the data security system 620 cannot be unlocked by the user). The server/console 640 will remove Reset flag for the data security system 620 so it will be not executed next time when the mobile device 610 is connected to the data security system 620.

While similar to FIGS. 7-11, after receiving the any command waiting signal 1100, the server/console 640 performs an unlock 1200 when there is a command to unlock with an administrator's password. An unlock with an administrator's password signal 1202 is sent to the mobile device 610, which provides an unlock with administrator's password signal 1204 to the data security system 620 to start the data security system unlocked operation 804. Thereafter, the mobile device 610 and the data security system 620 are in full operative communication.

Figure 13:
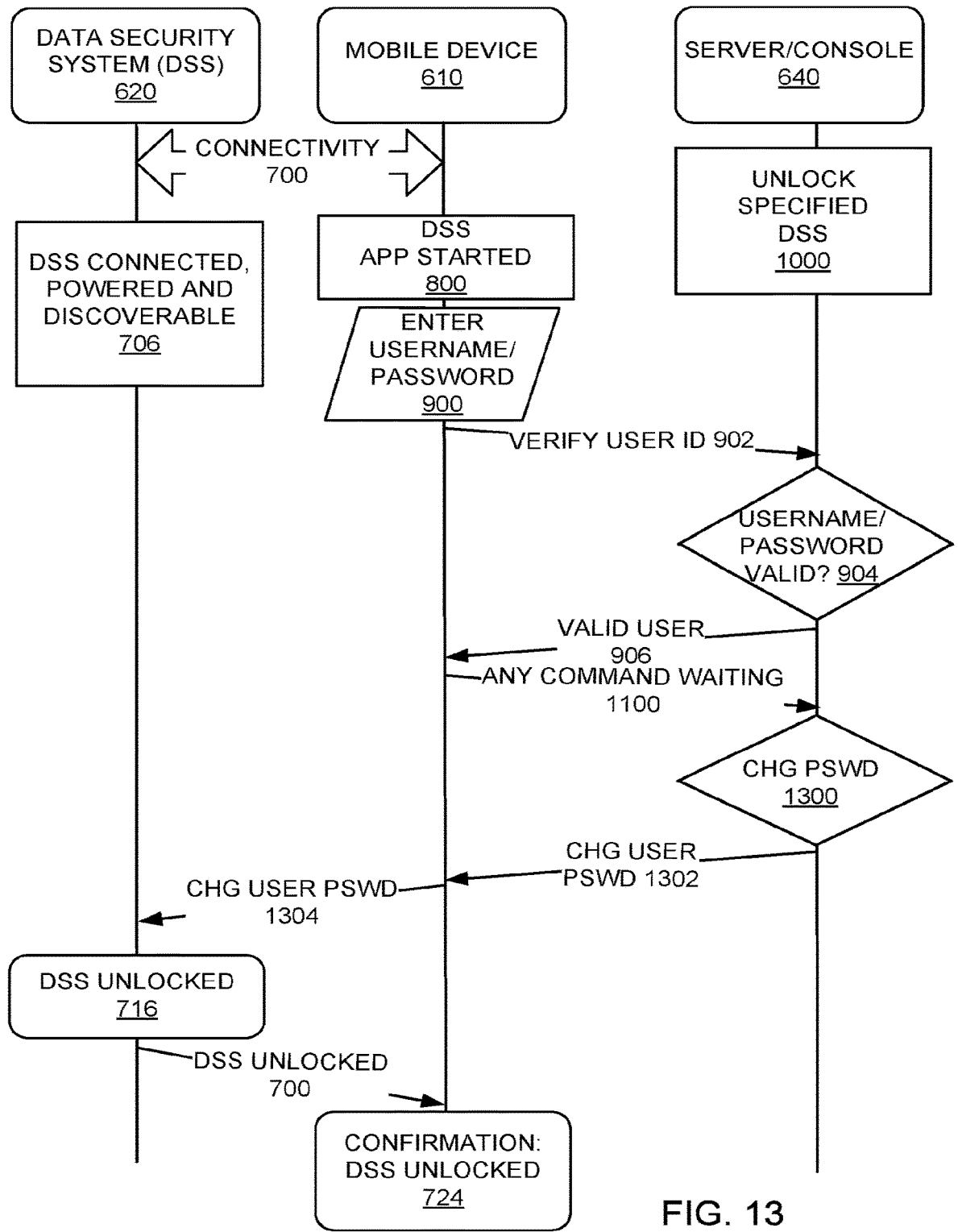
FIG. 13 is a change user's password sequencing diagram using the server/console.

Referring now to FIG. 13, therein is shown a change user's password sequencing diagram using the server/console 640. This diagram shows ability to change User's password for data security system 620 remotely via the server/console 640. Even data security system 620 can receive commands only from the mobile device 610 over the wireless connection, by setting a "Change User's Password" flag on the server/console 640 console for a specific data security system (using its S/N), the data security system application 618 running on the mobile device 610 will query the server/console 640 for any flags/pending requests. When user will connect his data security system 620, the data security system application 618 on the mobile device 610 will execute waiting "Change User's Password" command. After successful unlock and changed password, the user's data is untouched and the data security system 620 can be unlocked with new user's password. The server/console 640 will remove "Change User's Password" flag for this data security system 620 so it will be not executed next time when the mobile device 610 is connected to the specific data security system.

While similar to FIGS. 7-12, the server/console 640 responds to the any command waiting signal 1100 by making a change password determination 1300. When there has been a password change at the server/console 640 a change user password signal 1302 is sent to the mobile device 610, which sends a change user password signal 1304 to the data security system 620. Thereafter, the mobile device 610 and the data security system 620 are in full operative communication with the new password.

A method of operation of a data security system comprising: providing a mobile device with a data security system application for connectivity with the data security system; starting the data security system application; and maintaining connectivity of the data security system with the mobile device.

The method as described above wherein maintaining the connectivity maintains the connectivity when the data security system is within a predetermined proximity to the mobile device.

The method as described above wherein maintaining the connectivity maintains the connectivity when the data security system is within a predetermined proximity to the mobile device for a predetermined period of time.

The method as described above wherein establishing the connectivity includes using bi-directional communication between the data security system and the mobile device.

The method as described above wherein establishing the connectivity includes using uni-directional communication between the data security system and the mobile device.

The method as described above further comprising communication between the mobile device with the data security system application and a server containing a user management database.

The method as described above further comprising providing security information in a security controller in the data security system.

The method as described above further comprising: providing a server with identification of a specified data security system; providing the data security system with a specific identification; and unlocking the data security system when the identification of the specified data security system is the same as the specific identification of the data security system.

The method as described above wherein providing a mobile device with the data security system application provides a data security system administrator's application and further includes: setting an administrator's password in the mobile device; transmitting the administrator's password from the mobile device to the data security system; and setting the administrator's password in the data security system and unlocking the data security system.

The method as described above further comprising: providing an unlock request along with a mobile device identification from the mobile device to the data security system; and receiving the unlock request in the data security system and unlocking the data security system.

The method as described above further comprising: entering a user name or password in the mobile device; determining when the user name or password is valid in a server after receiving the user name or password from the mobile device; communicating from the server to the mobile device when the user name or password is valid; and communicating from the mobile device to the data security system when the user name or password is valid to unlock the data security system.

The method as described above further comprising: entering a user name or password in the mobile device; determining when the user name or password is valid in a server after receiving the user name or password from the mobile device; communicating from the server to the mobile device when the user name or password is valid; determining when the identification number is valid in the server after receiving identification number from the mobile device; and unlocking the data security system through the mobile device when the server determines the identification number is valid.

The method as described above further comprising: providing a valid location of the mobile device to a server; determining in the server when the mobile device is in the valid location; and unlocking the data security system through the mobile device when the server determines the mobile device is in the valid location.

The method as described above further comprising: providing a current time of operation for the data security system at the mobile device to a server; determining in the server when the mobile device is within the current time; and unlocking the data security system through the mobile device when the server determines the mobile device has the current time.

The method as described above further comprising: providing a command in a server; providing the command to the mobile device from the server in response to a command waiting signal from the mobile device; and performing the command in the data security system through the mobile device when the command is provided from the server.

The method as described above further comprising: providing a change password command in a server; providing the change password command to the mobile device from the server in response to a change password signal from the mobile device; and unlocking the data security system with the changed password in the data security system.

The method as described above further comprising connecting the data security system to a host computer for power and to be discoverable by the host computer.

A data security system comprising: a data security transceiver or receiver; an authentication subsystem operatively connected to the data security transceiver or receiver; and a storage subsystem connected to the authentication subsystem.

The system as described above further comprising a security controller connected to the data security transceiver or the receiver and to the authentication subsystem.

The system as described above further comprising a mobile device having a data security system application operating with the security controller for maintaining connectivity when the data security system is within a predetermined proximity to the mobile device.

The system as described above further comprising a mobile device having a data security system application operating with the security controller for maintaining connectivity when the data security system is within a predetermined proximity to the mobile device for a predetermined period of time.

The system as described above further comprising a mobile device having a mobile transceiver or receiver for maintaining connectivity includes using bi-directional communication between the data security system and the mobile device.

The system as described above further comprising a mobile device having a mobile transceiver or receiver for maintaining connectivity includes using uni-directional communication between the data security system and the mobile device.

The system as described above further comprising a wired or wireless connection communication between a mobile device with a data security system application and a server containing a user management database.

The system as described above wherein the data security system includes an external communication channel for connection to a host computer.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A secure access device comprising:
   a memory;
   an interface controller coupled to the memory and for coupling to an external data channel to communicate with a host device, the interface controller configured to disable access to the memory from the host device via the external data channel until a user is authenticated for access to the memory;
   a wireless transceiver for radiofrequency communication outside the external data channel; and
   an authentication subsystem configured to receive authentication information from the host device via the external data channel and configured to receive the authentication information via the wireless transceiver, the authentication subsystem further configured to send an unlock command to the interface controller to enable access to the memory via the external data channel after authenticating the authentication information.

2. The secure access device as recited in claim 1, further comprising:
   an electro-mechanical input mechanism for entering the authentication information, wherein the authentication subsystem is further configured for authenticating the authentication information received via the electro-mechanical input mechanism.

3. The secure access device as recited in claim 1, further comprising:
   an encryption engine for encrypting data received through the external data channel before storing the encrypted data in the memory, and for decrypting data read from the memory before sending the decrypted data through the external data channel.

4. The secure access device as recited in claim 1, wherein an application in a wireless device, in communication via the wireless transceiver, includes a user interface for entering the authentication information.

5. The secure access device as recited in claim 4, wherein the application in the wireless device allows the wireless device to lock the external data channel, unlock the external data channel, change the authentication information, and reset the secure access device.

6. The secure access device as recited in claim 4, wherein the application in the wireless device enables a remote server to restrict use of the secure access device to a predetermined geographic zone, to a predetermined time period, or to a combination thereof.

7. The secure access device as recited in claim 4, wherein the application in the wireless device is configurable to set an inactivity auto-lock to lock the secure access device automatically after a predetermined period of inactivity.

8. The secure access device as recited in claim 1, wherein the secure access device comprises a proximity auto-lock to lock the secure access device when a wireless device in communication via the wireless transceiver is not within a predetermined proximity for a predetermined time period.

9. The secure access device as recited in claim 1, wherein the secure access device is configured to interface with a host application that provides the authentication information.

10. The secure access device as recited in claim 1, wherein a wireless device is configured for interacting with a remote server to validate the authentication information for enabling access via the external data channel, wherein the authentication information is received from the wireless device via the wireless transceiver after the authentication information is validated by the remote server.

11. A method comprising:
disabling, by an interface controller in a secure access device, access to a memory in the secure access device via an external data channel until a user is authenticated by the secure access device;
receiving authentication information by the secure access device, wherein the secure access device is configured to receive the authentication information via a wireless transceiver for radiofrequency communications in the secure access device and via the external data channel from a host device;
authenticating, by an authentication subsystem in the secure access device, the authentication information received via the external data channel or via the wireless transceiver;
sending an unlock command, from the authentication subsystem to the interface controller, to enable access to the memory via the external data channel after authenticating the authentication information; and
enabling, by the interface controller, access to the memory via the external data channel after the authenticating.

12. The method as recited in claim 11, wherein the secure access device is further configured to receive the authentication information via an electro-mechanical input mechanism in the secure access device.

13. The method as recited in claim 11, further comprising:
encrypting, by an encryption engine in the secure access device, data received through the external data channel before storing the encrypted data in the memory; and
decrypting, by the encryption engine in the secure access device, data read from the memory before sending the decrypted data through the external data channel.

14. The method as recited in claim 11, further comprising:
receiving, via the wireless transceiver, the authentication information from a user via an application in a wireless device having a user interface for entering the authentication information.

15. The method as recited in claim 14, wherein the application in the wireless device allows the wireless device to lock the external data channel, unlock the external data channel, change the authentication information, and reset the secure access device.

16. The method as recited in claim 14, wherein the application in the wireless device enables a remote server to restrict use of the secure access device to a predetermined geographic zone, to a predetermined time period, or to a combination thereof.

17. The method as recited in claim 14, wherein the application in the wireless device is configurable to set an inactivity auto-lock to lock the secure access device automatically after a predetermined period of inactivity.

18. The method as recited in claim 11, wherein the secure access device comprises a proximity auto-lock to lock the secure access device when a wireless device in communication via the wireless transceiver is not within a predetermined proximity for a predetermined time period.

19. A non-transitory machine-readable storage medium including instructions that, when executed by a machine, cause the machine to perform operations comprising:
disabling, by an interface controller in a secure access device, access to a memory in the secure access device via an external data channel until a user is authenticated by the secure access device;
receiving authentication information by the secure access device, wherein the secure access device is configured to receive the authentication information via a wireless transceiver for radiofrequency communications in the secure access device and via the external data channel from a host device;
authenticating, by an authentication subsystem in the secure access device, the authentication information received via the external data channel or via the wireless transceiver;
sending an unlock command, from the authentication subsystem to the interface controller, to enable access to the memory via the external data channel after authenticating the authentication information; and
enabling, by the interface controller, access to the memory via the external data channel after the authenticating.

20. The non-transitory machine-readable storage medium as recited in claim 19, wherein the secure access device is further configured to receive the authentication information via an electro-mechanical input mechanism in the secure access device.

* * * * *